United States Patent [19]

Hayashi et al.

[11] Patent Number: 5,305,122
[45] Date of Patent: Apr. 19, 1994

[54] IMAGE READING AND PROCESSING APPARATUS SUITABLE FOR USE AS A COLOR HAND-HELD SCANNER

[75] Inventors: Toshio Hayashi, Kawasaki; Kiyoharu Yoshioka, Yokohama, both of Japan

[73] Assignee: Canon Kabushiki Kaisha, Tokyo, Japan

[21] Appl. No.: 807,654

[22] Filed: Dec. 16, 1991

Related U.S. Application Data

[63] Continuation of Ser. No. 397,892, Aug. 24, 1989.

[30] Foreign Application Priority Data

| Aug. 31, 1988 | [JP] | Japan | 63-216940 |
| Aug. 31, 1988 | [JP] | Japan | 63-216941 |
| Sep. 2, 1988 | [JP] | Japan | 63-219969 |
| Sep. 2, 1988 | [JP] | Japan | 63-219970 |

[51] Int. Cl.$^5$ .............................................. H04N 1/46
[52] U.S. Cl. ..................................... 358/530; 358/448
[58] Field of Search ............... 358/75, 471, 473, 909, 358/296, 80, 494, 505, 530, 539; 382/59; H04N 1/46, 1/04

[56] References Cited

U.S. PATENT DOCUMENTS

| 4,196,450 | 4/1980 | Miller et al. | 358/473 |
| 4,736,251 | 4/1988 | Sasaoka | 358/75 |
| 4,774,566 | 9/1988 | Kawamura et al. | 358/75 |
| 4,777,536 | 10/1988 | Kato | 358/298 |
| 4,809,061 | 2/1989 | Suzuki | 358/75 |
| 4,866,535 | 9/1989 | Kubota et al. | 358/59 |
| 4,891,690 | 1/1990 | Hasegawa et al. | 358/75 |
| 4,894,730 | 1/1990 | Yanagawa et al. | 358/473 |
| 5,032,928 | 7/1991 | Sakai et al. | 358/448 |
| 5,038,207 | 8/1991 | Itagaki et al. | 358/75 |

FOREIGN PATENT DOCUMENTS

| 357054A | 3/1990 | European Pat. Off. |
| 2-131071 | 5/1990 | Japan |

OTHER PUBLICATIONS

Rip-off Artist Learns to Read, pp. 50–51, Dak Industries, Inc. 1991.

*Primary Examiner*—Stephen Brinich
*Attorney, Agent, or Firm*—Fitzpatrick, Cella, Harper & Scinto

[57] ABSTRACT

A hand-scanning color scanner is disclosed which comprises an image sensor provided with color-separation filters for outputting color-component signals, optical means, such as a lamp and other elements, for projecting an image of a manuscript on the image sensor, an encoder for generating pulses in accordance with a movement relative to the surface of the manuscript, processing means for taking in signals output by the image sensor, performing color processing and producing color image signals, and output means for outputting a predetermined signal indicating that an effective color image signal is produced from the processing means according to the pulses from the encoder.

14 Claims, 24 Drawing Sheets

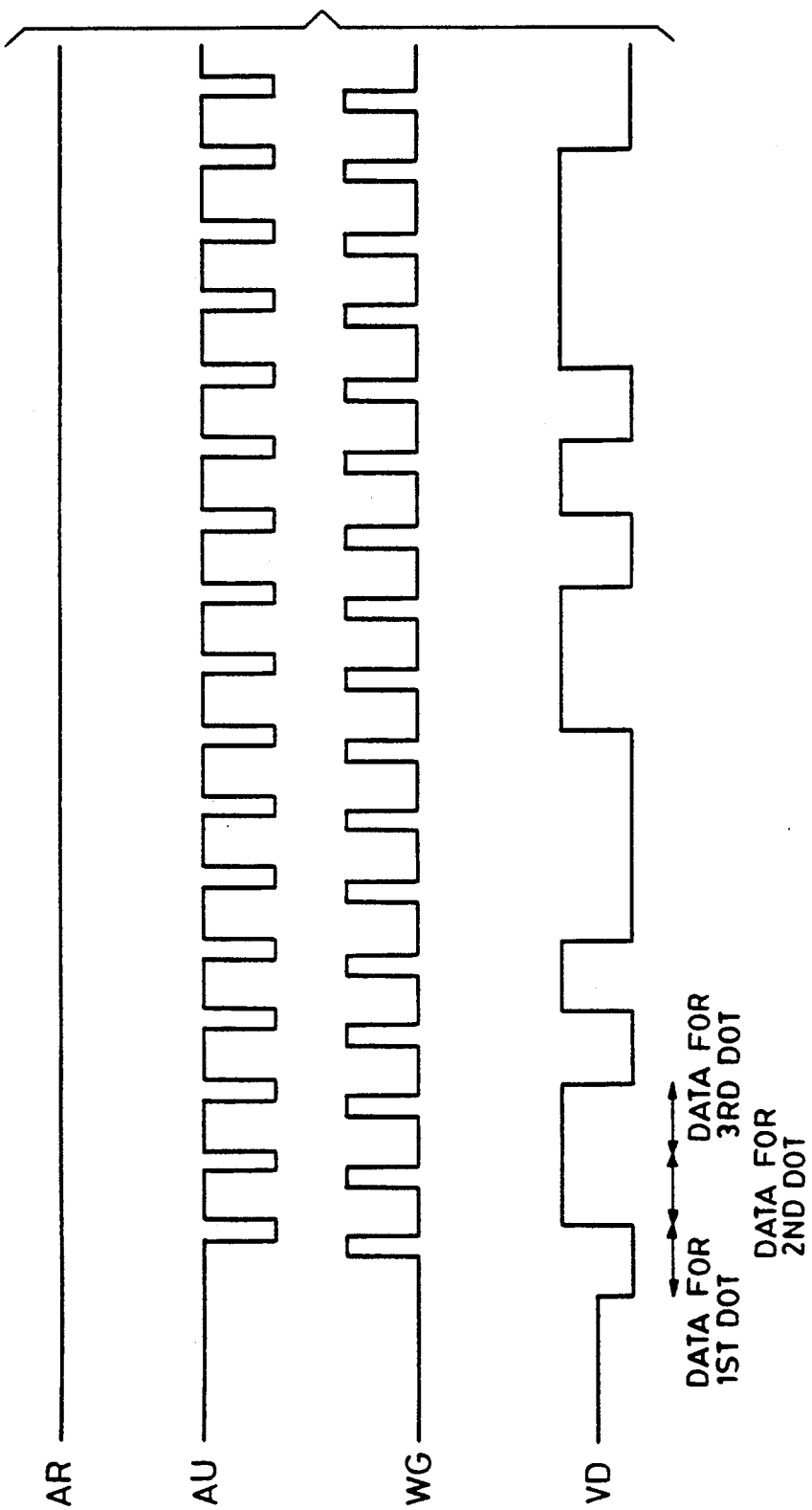

FIG. 6
| D11 | | | D8 | D7 | | | D4 | D3 | | | D0 |
|---|---|---|---|---|---|---|---|---|---|---|---|
| MSB C3 | C2 | C1 | LSB C0 | MSB M3 | M2 | M1 | LSB M0 | MSB Y3 | Y2 | Y1 | LSB Y0 |
FIG. 7
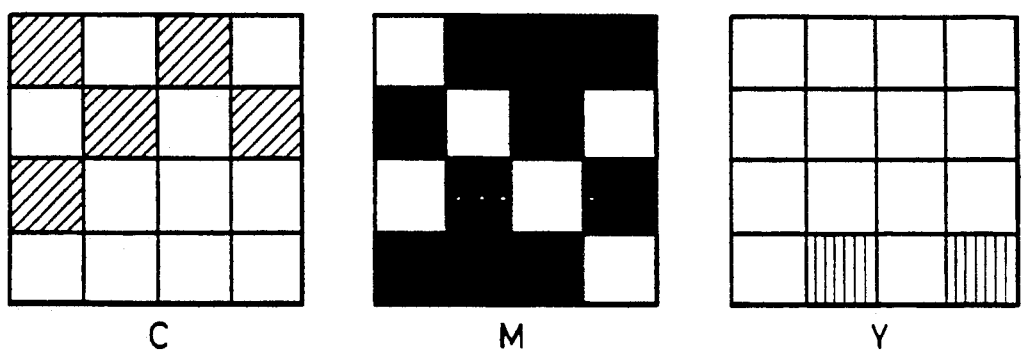
C　　　　　M　　　　　Y
FIG. 8
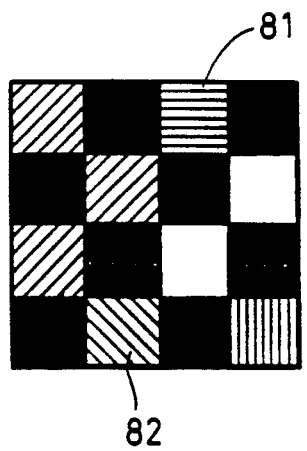

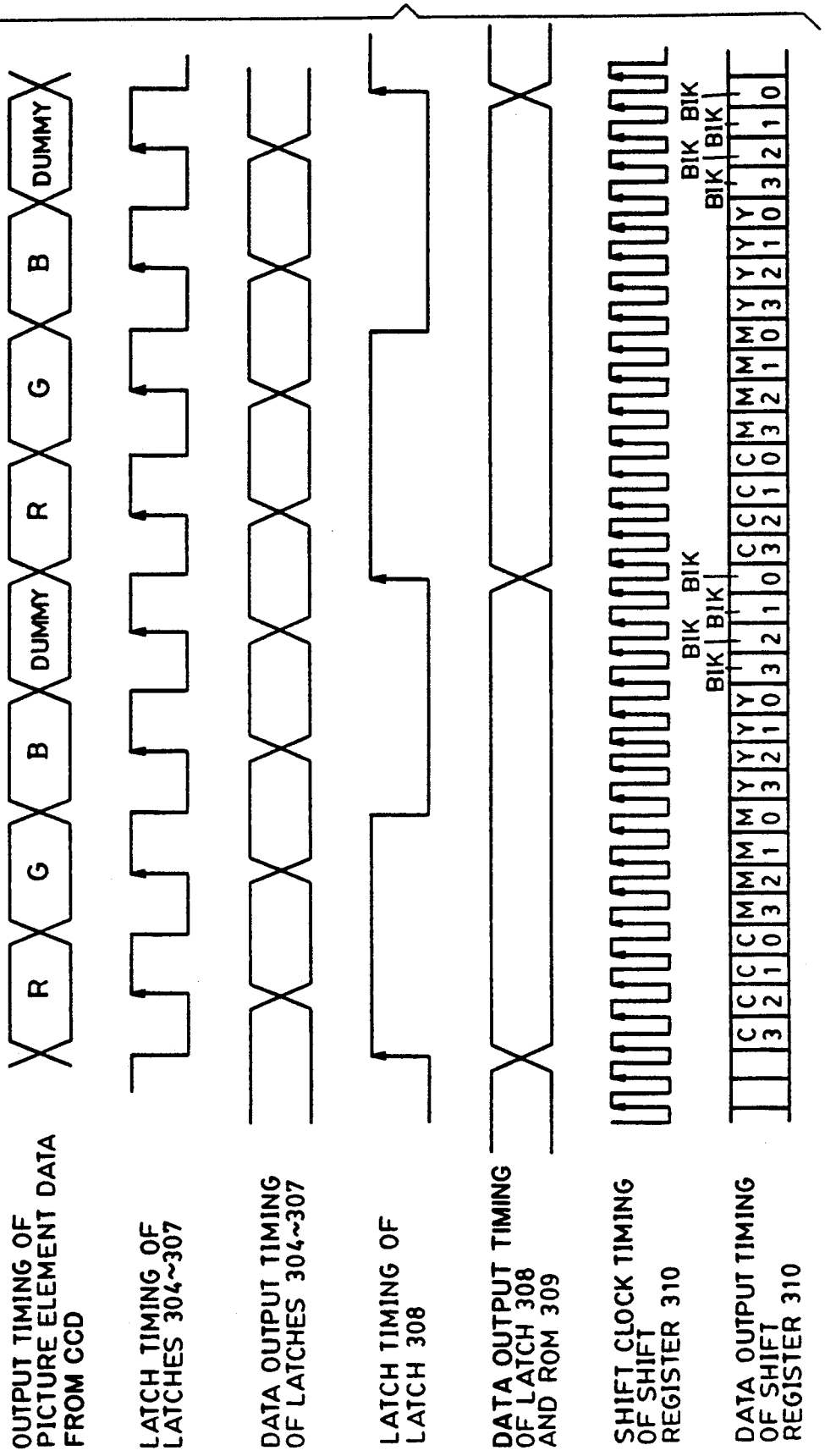

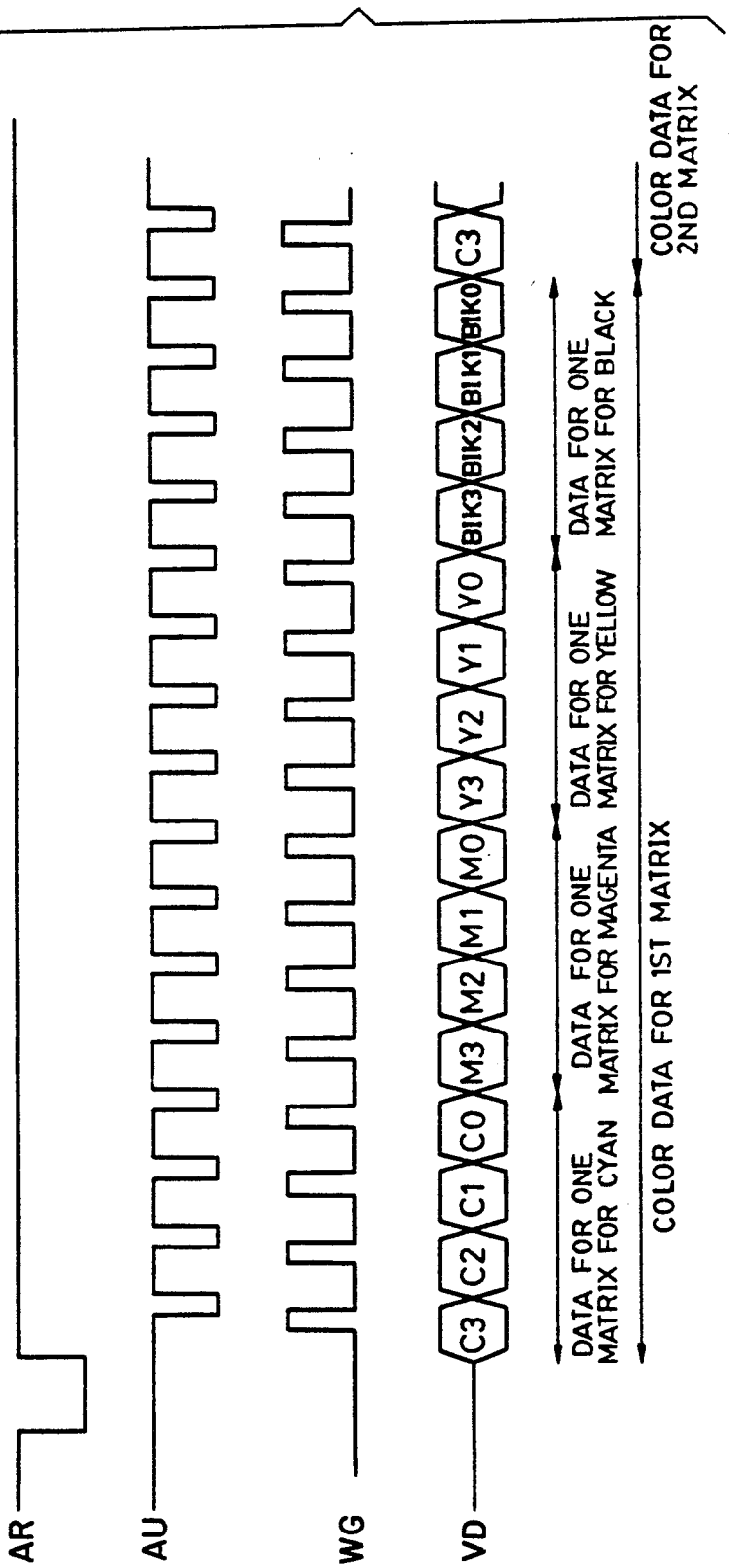

IMAGE READING AND PROCESSING APPARATUS SUITABLE FOR USE AS A COLOR HAND-HELD SCANNER

This application is a continuation of application Ser. No. 07/397,892 filed Aug. 24, 1989.

BACKGROUND OF THE INVENTION

1. Field of the Invention

This invention relates to an image processing apparatus, and more particularly, to an apparatus capable of processing a color image, and an image reading apparatus.

2. Description of the Related Art

Heretofore, as an example of such image processing apparatus, there has been known an apparatus which converts an object image into electric signals using, for example, a scanner. As an example of such apparatus, there is known an apparatus which performs photoelectric conversion by means of a sensor having, for example, three light sources for R, G and B, and which switches emission colors by switching among the light sources.

In the above-described apparatus, however, if a method is used in which, for example, a luminance signal and a color signal are separately transmitted, or if each color component is separated and the color components are transmitted in parallel, for the transmitting of color images, there arises, first, the problem that the configuration at the reception side becomes complicated.

Recently, a tendency toward increasing personal use of business machines has been advancing, and remarkable technical progress toward smaller and cheaper machines is being made. Personal computers and word processors occupy the central core of these machines, and image scanners are utilized for preparing intercompany publicity, invitation cards and the like using personal computers or word processors.

Manual-scanning-type image scanners are mainly being used with such systems. With an image scanner, it is possible to perform a two-dimensional reading by forming an image of a manuscript illuminated by an LED array or the like on a line image sensor, and moving the main body of the scanner along the surface of the manuscript.

A handy-type black-and-white-image reading apparatus for inputting images is attached to the above-described personal computer or word processor. Color image processing also becomes possible keeping pace with the development of inks of colors, such as Y, M and C and the like. There has been thereby performed the development of reading apparatuses which convert color images into electric signals to be input to personal computers, word processors and the like. As such reading apparatus, a manual-scanning color scanner capable of performing color reading is desired. Although a scanner for monochrome manuscripts is sufficient for reading, for example, logo marks, demand for color reading is nevertheless strong for photographs and the like. This demand is becoming stronger as the tendency toward the greater use of personal and color displays printers advances.

As an image sensor for reading color images, there is known a CCD color image sensor which has plural photosensors aligned on a line and is provided with R, G and B striped filters in the direction of the line, and which performs color separation of the corresponding area on a manuscript by making continuous R, G and B signals for each line, or the like.

Color reading of a manuscript is usually performed according to the following process using, for example, the above-described CCD color image sensor.

First, the manuscript is subjected to color separation using red (R), green (G) and blue (B) filters, and converted into gradation information consisting typically of anywhere from 64 gradations to 256 gradations. Subsequently, various corrections, such as masking of the filters, $\gamma$-correction, logarithmic transformation, ink correction and the like, are performed to obtain color image data for yellow (Y), magenta (M) and cyan (C).

However, when a manual-scanning color scanner is used, the manual-scanning color scanner must be light in weight and compact in size so that it can be promptly moved to a desired position.

Accordingly, there is a limitation on the processing circuit and the like which can be incorporated in the scanner in order to perform excellent color processing.

Furthermore, a manual-scanning scanner is moved at an arbitrary timing and an arbitrary speed. If the interval between reading scanning lines of a color image changes according to this arbitrary movement, distortion may occur in the output image.

In addition, the time for reading an image on an identical line differs when moving at a high speed and when moving at a low speed, and hence the density of an image fluctuates. There is therefore the second problem that, although the above-described problems can be corrected by simply changing the threshold value in a scanner for monochrome images having binary values, the problems can not be easily dealt with in a color scanner because the influence is not only on density but also on color balance.

Moreover, dynamic ranges of R, G and B signals read from a CCD color image sensor are in general not equal to one another. Accordingly, in an image reading apparatus in which analog color signals for three colors are amplified, the amplified signals are subjected to A/D conversion by an A/D converter, and image data are subjected to digital processing, the number of gradations from the white level to the black level of each image is different from one another for R, G and B.

This is because the spectral distribution of an illuminating light source in the visible region is not uniform, and there are variations in light transmittance of R, G and B filters attached to CCD color image sensors and the sensitivity as a function of wavelength of CCD color image sensors.

An example of the spectral distribution of an illuminating light source and an example of the sensitivity for wavelength of R, G and B picture elements are shown in FIGS. 23 and 24, respectively. The ordinates are measured in arbitrary (relative) units in both figures.

Relative to R, G and B signal levels when a white manuscript is illuminated by a light source having the spectral distribution shown in FIG. 23, the R signal is the largest and then there come the G and B signals, in descending order.

At this time, if a reference voltage of an A/D converter having a resolution of 5 bits is set for use with the output an R picture element, 32 gradations can be obtained for the R picture element, but only 26 and 20 gradations can be obtained for a G picture element and a B picture element, respectively.

When the number of gradations from the white level to the black level (more exactly, the maximum-saturation level) of each picture element for R, G and B thus differs, color separation and, consequently, image processing of a manuscript become difficult.

In order to solve this problem, the following method can be considered. That is, as shown in FIG. 25, analog-signal amplification units 421–423 for inputting picture-element signals of a CCD 401 are provided, and the gain of each unit is adjusted to each picture element for R, G and B. Outputs of the three amplification units 421–423 are sequentially selected by a selector 424 in synchronization with the driving timing of the CCD 401 to transmit to an A/D converter 403, and 32 gradations are obtained for all the three picture elements. However, this approach entails a third problem, that the circuit scale becomes large.

Now, a conventional line sensor has in general a configuration as shown in FIG. 26.

In FIG. 26, a photodiode array PD has plural photodiodes aligned in the form of a line. CCD analog shift registers CCD A and CCD B correspond to odd-numbered and even-numbered photodiodes, respectively, and transfer signal charges stored in each photodiode. An output stage O synthesizes signals transferred separately in the two channels by the CCD A and CCD B into one channel, and generates a video signal V.

In order to operate such a CCD color image sensor sequentially provided with R, G and B filters in the direction of the line, shift pulses SH, transfer pulses $\phi_1$, and $\phi_2$, and reset pulses RS are in general input to the image sensor with timings shown in FIG. 27.

The shift pulses SH are pulses for turning on and off shift electrodes. When the shift electrodes are turned on, signal charges in the photodiode array PD as a photosensitive unit are all transferred to the CCD shift registers CCD A and CCD B as transfer units. After the shift electrodes have been turned off, the signal charges are sequentially transferred through the CCD shift registers CCD A and CCD B by transfer pulses $\phi_1$ and $\phi_2$.

The CCD shift registers transfer signal charges one stage for every one period of the transfer pulses $\phi_1$ and $\phi_2$, and the transferred signal charges flow into a floating capacitor at the output stage O. These charges change the voltage of the floating capacitor by an amount $V = q/c$, where q is the net charges transferred to the capacitor and c is the capacitance. This change in voltage changes the current flowing through a load resistance, and is output as a signal OS of voltage.

Since it is necessary to return the voltage of the floating capacitor to an initial value for detecting the signal charges of the next picture element, reset pulses RS are added to the output stage O to cancel the voltage of the floating capacitor.

In the signal OS, the leading 48 bits are dummy bits, and an effective signal can be obtained from the 49th bit, in the example shown in FIG. 27. As the effective signal, each picture-element signal for R, G and B is sequentially output, a group of three consecutive picture elements, one each for R, G and B, are made one set, and color separation of an area on a manuscript corresponding to the one set is performed. The effective signal consists of 1560 bits, that is, 520 sets. After the entire effective signal has been output, additional dummy bits are output until the next SH pulse arrives.

Now, the signal processing procedure until the analog image signal OS output from the CCD line sensor illustrated in FIG. 26 is converted into a digital image signal will be explained with reference to FIG. 28.

Since a DC component is added to an image signal read by the CCD line sensor 501, the DC component is removed at a DC cut unit 601 within an amplification unit 502. The signal is then subjected to sampling-and-holding for every picture element by a sample-and-hold circuit 602, and the resultant signal is amplified by an amplification unit 603. Since a small amount of DC component as noise is added to the amplified signal, the DC component is removed by a DC cut unit 604. The amplified signal from which the noise has been removed is input to an A/D converter 503, and is subjected to analog-to-digital conversion for every picture element.

In the above-described conventional driving method, however, when there is adopted a method in which an image signal for one set of R, G and B picture elements is converted into a print signal for Y, M, C and Bk (Y, M, C and Bk indicate yellow, magenta, cyan and black, respectively) picture elements, it is necessary to output the signal for one set of Y, M, C and Bk within a time during which a signal for one set of R, G and B is read from the CCD.

At this time, if the $\phi_1$ and $\phi_2$ are made, for example, by frequency-dividing by 4 a system clock SCLK as a base clock, 12 clocks SCLK are required for reading a signal for three colors, R, G and B. Accordingly, when transmitting print data for 4 colors, Y, M, C and Bk, data for each color, Y, M, C and Bk, must be transmitted by 3 clocks, respectively.

Furthermore, if the $\phi_1$ and $\phi_2$ are made by frequency-dividing by 8 the system clock SCLK, print data for 4 colors are to be transmitted by 6 clocks for each color, Y, M, C and Bk, respectively, but clocks for one color become clocks multiplied by 3, such as 3, 6, 9, 12, - - - .

Now, when there is used a method in which, in an image reproducing unit, for example, the density corresponding to data consisting of one set of R, G and B to be input is reproduced as a visible image by the number of Y, M, C and Bk dots plotted within a 4×4 dot matrix, data for Y, M, C and Bk are output as print data consisting of 4 bits for each, that is, 16 bits in total, for the reading of an image signal consisting of one set of R, G and B.

At this time, when data are transferred by 6 clocks for each color, Y, M, C and Bk as described above, there can be considered a method in which 2 invalid bits are added to 4 bits of data for every 4 colors to made 6-bit data for one color, and the data are transferred by 6 clocks. However, since 33% of the data to be transferred is invalid, the transfer efficiency of data is inferior, and this method is therefore not preferable.

In order to solve this problem, it is necessary to provide a second oscillation circuit for data transfer separately from the system clock SCLK. Furthermore, the clock of the second oscillation circuit must be perfectly synchronized with the system clock SCLK.

In addition, when reading a white manuscript and the like, the output signal of the amplification unit 603 shown in FIG. 28 resembles a DC signal when there continues a state in which the magnitudes of R, G and B signals are uniform, as for a white manuscript. Hence, even a part of an image signal is removed at the DC cut unit 604.

Accordingly, there is the fourth problem, that it is difficult to obtain a high-quality color image.

SUMMARY OF THE INVENTION

It is an object of the present invention to provide an image processing apparatus which can individually or totally solve the above-described first through fourth problems.

Under such an object, it is a further object of the present invention to provide an image processing apparatus which can perform transmission in a simple transmission form when transmitting a color image.

It is a still further object of the present invention to provide a color-image reading apparatus which can stably read a color image.

It is still another object of the present invention to provide a driving method of a color sensor in which, when reading a color image by the color sensor and converting R, G and B signals obtained into color signals for printing, such conversion can be easily performed.

It is still a further object of the present invention to provide a novel hand-scanning-type color sensor.

It is still another object of the present invention to provide a color-image processing apparatus which can excellently process color-image information and black-and-white-image information.

These and other objects are accomplished, according to one aspect of the present invention, by a hand-scanning color scanner comprising an image sensor provided with a color separation filter for outputting a color-component signal, optical means for projecting an image of a manuscript on the image sensor, generation means for generating a pulse in accordance with a movement relative to the surface of the manuscript, processing means for taking in a signal of the image sensor and performing a color processing of the signal to form a color image signal, and output means for outputting a predetermined signal indicating that an effective color image signal is produced from the processing means according to the pulse from the generation means.

These and other objects and features of the present invention will become more apparent from the following description of the preferred embodiments taken in connection with the accompanying drawings.

BRIEF DESCRIPTION OF THE DRAWINGS

FIG. 2 is an example of timing charts of an interface when black-and-white data are transmitted;

FIG. 6 is a diagram showing the bit allocation of data of a ROM 6;

FIG. 7 is a diagram showing an example of print patterns of C, M and Y;

FIG. 8 is a diagram showing a matrix after printing overlapping the patterns illustrated in FIG. 7;

FIG. 12-1 is a block diagram of an example of the electric circuit of the hand-scanning color scanner;

FIG. 12-2 is a block diagram of another example different from that in FIG. 12-1;

FIG. 16 illustrates operation timing charts for latches and shift registers;

FIG. 17 is a diagram showing a bit allocation of data;

FIG. 18 illustrates timing charts of interface signals;

DESCRIPTION OF THE PREFERRED EMBODIMENTS

The preferred embodiments of the present invention will be hereinafter explained with reference to the drawings.

Figure 3:
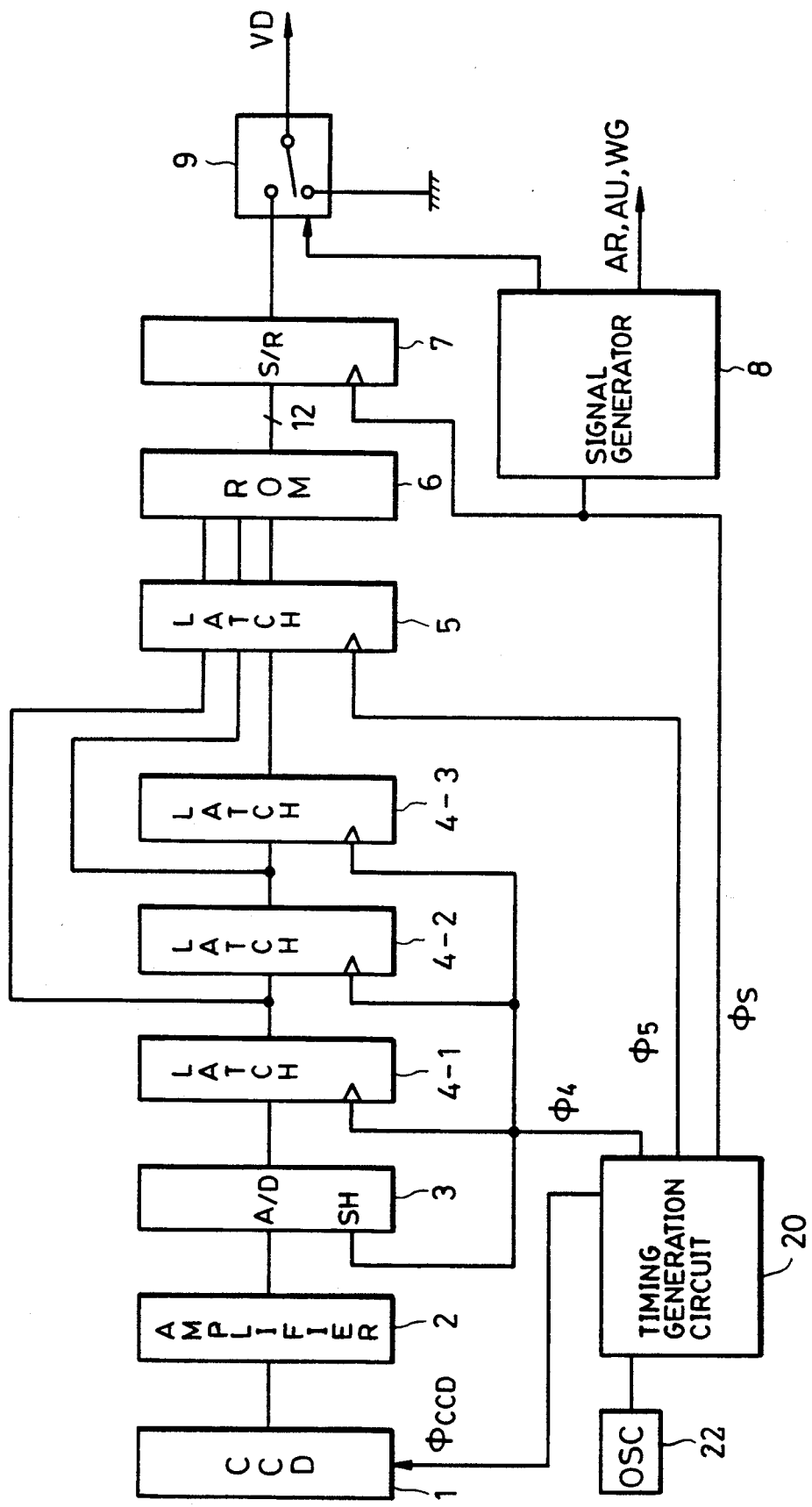
FIG. 3 is a circuit block diagram of an apparatus at the transmission side of the first embodiment of the present invention.
Figure 4:
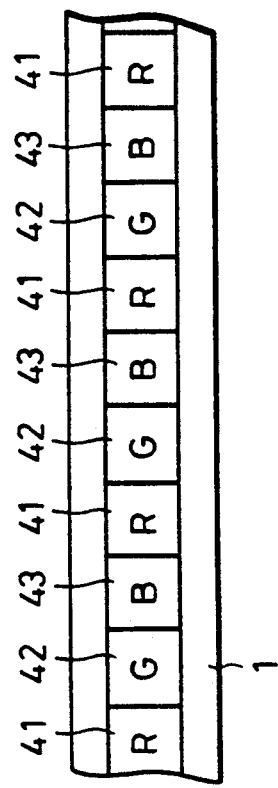
FIG. 4 is a diagram showing the state of R, G and B filters of the CCD 1 illustrated in FIG. 3.

FIG. 3 is a block diagram of a color-image reading apparatus to which the present invention is applied. A CCD 1 provided with R, G and B striped filters reads a color image, and the filter has a configuration as shown in FIG. 4.

An amplifier 2 amplifies analog image signals from the CCD 1. An A/D converter 3 converts analog image signals amplified by the amplifier 2 into digital image signals. A latch 4, illustrated as comprising latches 4-1, 4-2 and 4-3, samples R, G and B digital signals serially output from the A/D converter 3 for the data for each picture element. A latch 5 samples output data of the latch 4 for every 3 picture elements. A ROM 6 outputs Y, M and C image signals corresponding to output data from the latch 5. A shift register 7 converts Y, M and C image signals output from the ROM 6 into serial data. A signal generator 8 generates an interface signal and a signal for switching a selector 9 which will be described later.

The selector 9 selects either the output from the shift register 7 or a signal at ground voltage "0" as an output VD.

A clock generator 22 provides a reference oscillation for a timing generation circuit 20. The timing generation circuit 20 generates driving pulses $\phi_{CCD}$ for the CCD 1, timing pulses $\phi_4$ for the A/D converter 3 and the latches 4-1, 4-2 and 4 timing pulses $\phi_5$ for the latch 5, and shift pulses $\phi_s$ for the shift register 7 and the signal generator 8.

Next, the operation of the apparatus of the present embodiment will be explained mainly with reference to FIG. 3.

Figure 5:
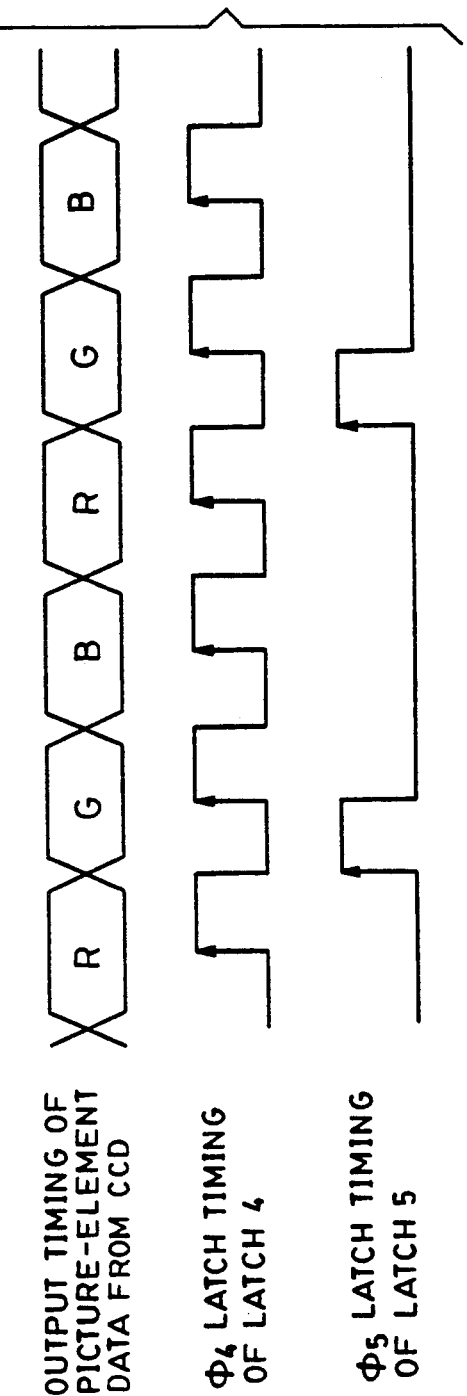
FIG. 5 illustrates timing charts showing latch timings of latches 4 and 5.

A color image is read by the CCD 1. Image signals passing through each filter of R, G and B are sequentially output in the main scanning direction in synchronization with driving pulses $\phi_{CCD}$, amplified by the amplifier 2, and then input to the A/D converter 3 to be converted into 4-bit image signals. Data for 3 picture elements in the signals are held by the latches 4-1, 4-2 and 4-3, and are input to the latch 5. Latch timings of the latches 4-1, 4-2 and 4-3 and the latch 5 are as shown in FIG. 5. Since the latch 5 takes in outputs of the respective latches 4-1, 4-2 and 4-3 in a state in which data for G, B and R are latched in the latches 4-1, 4-2 and 4-3, respectively, picture-image data for R, G and B are input to predetermined addresses in the ROM 6, respectively.

The ROM 6 converts the input data into multivalued data consisting of 4 bits for each color, Y, M and C, that is, 12 bits in total, in a form including all of complementary-color conversion, masking and the like in accordance with input data for R, G and B. The 12-bit parallel data output from the ROM 6, which have been subjected to a bit allocation as shown in FIG. 6, are taken into the 12-bit shift register 7 in parallel, and are then converted into serial data VD by sequentially reading the data from the shift register 7. Respective 4-bit signals for C, M and Y are subjected to serial-parallel conversion at the host apparatus side receiving the serial data VD, and processed, for example, as data for the number of dots to be plotted within a 4×4 matrix.

Figure 1:
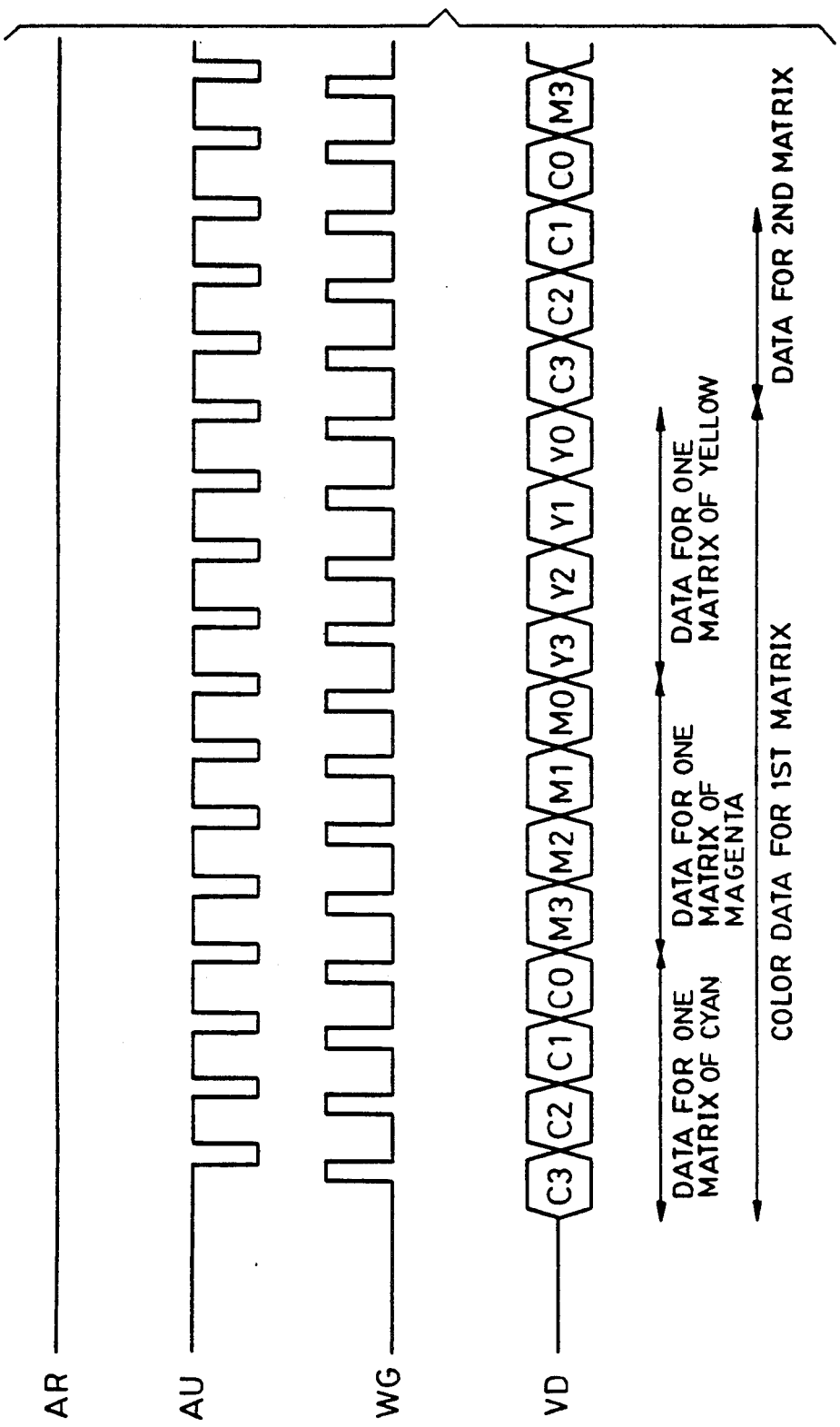
FIG. 1 is an example of timing charts of an interface when color image data are transmitted in an apparatus of a first embodiment of the present invention.

The serial data VD are output to the outside in synchronization with interface signals AR, AU and WG generated from the signal generator, as shown in timing charts in FIG. 1. As described later, before the serial data VD are output, the selector 9 is switched to the ground side, and "0", indicating that the data VD are not black-and-white data, but color data, is output during a period corresponding to 5 bits.

Next, timing charts of interface signals are shown in FIG. 1.

The 12-bit data to be output from the ROM 6 are output bit by bit starting with the most significant bit (D11) by the shift register 7 in synchronization with the AR, AU and WG signals. That is, 4 bits from the leading data are data for a C1 (cyan) matrix, bits 5-8 are data for an M1 (magenta) matrix, and bits 9-12 are data for a Y1 (yellow) matrix. Subsequently, these data are sequentially and repeatedly output. That is, the data length of 12-bit signal VD becomes data corresponding to one matrix at the host apparatus side.

As described later, at the host apparatus side, a serial-parallel conversion is performed for every 12-bit string of serial data for C, M and Y. Each 4-bit string of multivalued data for C, M and Y is restored by a serial-parallel conversion means, and image processing is performed by taking correlation of 3 colors to reproduce a color image.

If data corresponding to a certain matrix are, for example, 4B2 (a hexadecimal number) at the output of the ROM 6, the binary image signal VD at that time, 010010110010 is sequentially output in synchronization with the AR, AU and WG. At the host apparatus side, these data are subjected to serial-parallel conversion, and it is recognized that C data correspond to 4, M data correspond to B, and Y data correspond to 2. If a correction is made as a result of an image processing taking the correlation of these three sets of data, and C data correspond to 5, M data correspond to A, and Y data correspond to 2, the result indicates that C data have a gradation level of 5 among 16 gradations, M data have a gradation level of 10, and Y data have a gradation level of 2. Print densities in the corresponding matrix are then determined, for example, as shown in FIG. 7, and printing is performed by a printer unit as shown in FIG. 8. In FIG. 8, a portion indicated by the numeral 81 becomes blue because C and M overlap there with each other, and a portion indicated by the numeral 82 becomes red because M and Y overlap there with each other.

Next, the configuration of an apparatus at the host apparatus side, that is, the reception side receiving signals configured as described above will be explained with reference to FIG. 9.

Figure 9:
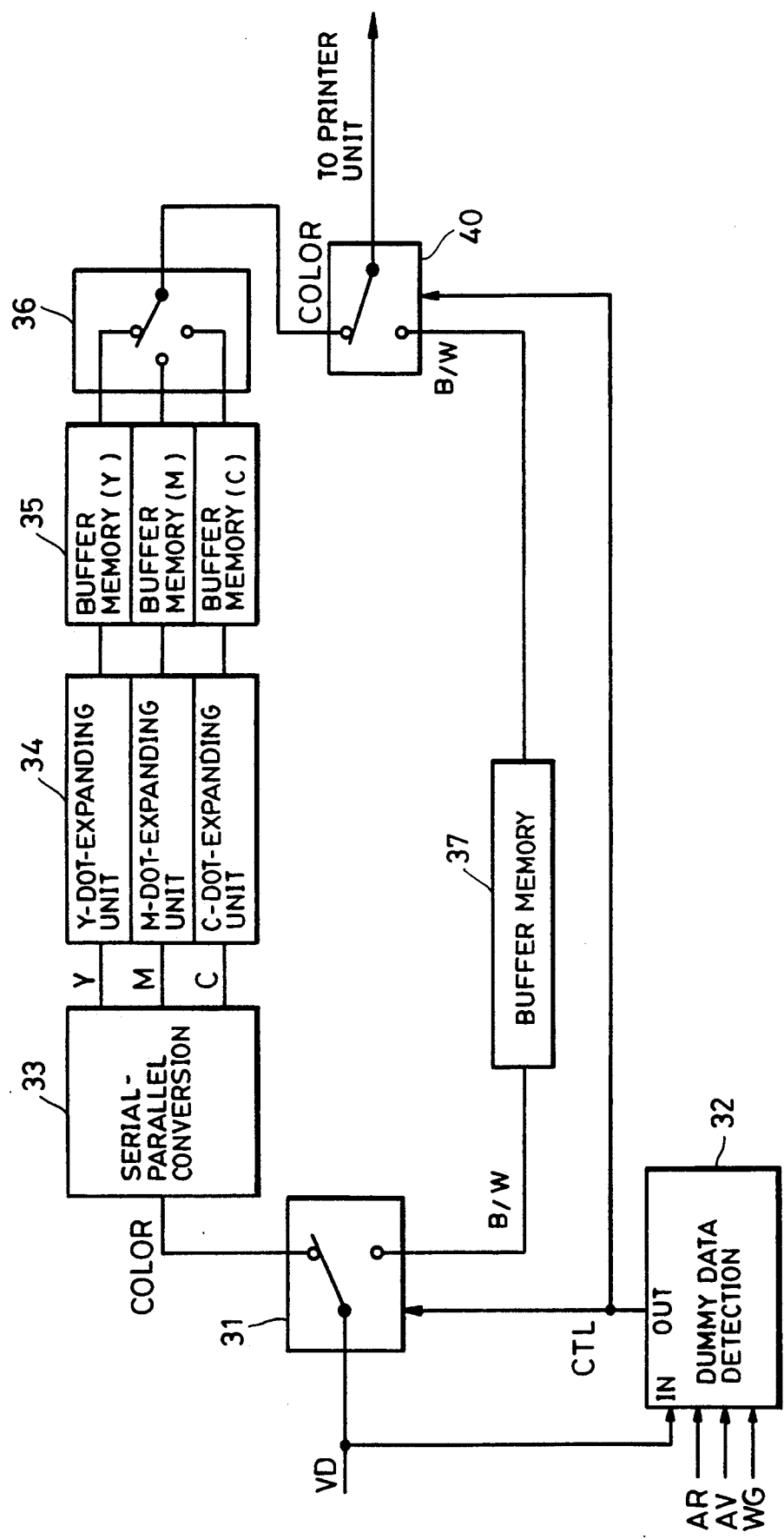
FIG. 9 is a diagram showing the configuration of an apparatus at the host apparatus side, that is, the reception side.

The configuration at the host apparatus side is as shown in FIG. 9.

In FIG. 9, a selector 31 switches the destination of the output of the image signal VD to the color side when the signal is 0 and to the B/W side when the signal is 1, according to the signal CTL from a dummy-data detection circuit 32.

Data detection by one bit is sufficient for the detection of dummy data. In the present embodiment, however, in order to increase the accuracy in discrimination, a color-image reading apparatus is controlled so as to output "0" from the first dummy bit to the fifth dummy bit. On the other hand, a black-and-white-image reading apparatus is configured so as to output "1" from the first dummy bit to the fifth dummy bit as dummy data.

The dummy-data detection circuit 32 is configured as shown in FIG. 10(b), in which an LT generation circuit 38 generates a timing signal LT shown in FIG. 10(a) in accordance with the AR, AV and WG to be input. That is, the CTL of the third dummy datum is latched by a D-type flip-flop 39 by the leading edge of the LT.

That is, if the image input apparatus connected to the host apparatus is a black-and-white-image reading apparatus, the CTL=1. At this time, the dummy-data detection circuit 32 controls the selector 31 so that the VD is input to a buffer memory 37, which holds data for lines requested by a printer unit (not illustrated), and sequentially outputs data in a lump.

On the other hand, if the image input apparatus connected to the host apparatus is a color-image reading apparatus, the CTL=0. At this time, the dummy-data detection circuit 32 controls the selector 31 so that the VD is input to a serial-parallel converter 33, and the VD is restored to respective 4-bit gradation-multivalued data for Y, M and C. The 4-bit data for Y, M and C are input to dot-expanding units 34, in which dot matrices corresponding to respective gradations are selected and input to buffer memories 35. The buffer memories 35 hold data for lines requested by a printer unit at the next stage, and sequentially output data in a lump. A selector 36 selects among the three buffer memories 35 for output to a selector 40, which outputs the signal to the printer unit. Selector 40 is linked with the selector 31; that is, when the selector 31 is at the Color side, the selector 40 is also connected to the Color side.

If described above, a color image signal is output in the form of a signal identical (in format) that in a conventional black-and-white-image apparatus, the host apparatus side can receive the color image signal by modifying only a part of a binary black-and-white image signal processing process. Furthermore, by having two systems, that is, a black-and-white image signal processing system and a color image signal processing system (for example, by selecting ROM's storing respective processing programs and the like) as the receiving apparatus at the host apparatus side in the present embodiment, it is possible to input an image to either of a black-and-white-image reading apparatus and a color-image reading apparatus.

OTHER EMBODIMENTS

In the above description, an explanation has been provided assuming that the ROM 6 in FIG. 3 is a multi-valued data conversion means for 12-bit data for Y, M and C in total, and the shift register 7 is a 12-bit parallel-serial converter. If it is assumed that the ROM 6 is a multivalued-data conversion means for data consisting of 16 bits in total in which 4 dummy bits are added to the 12-bit multivalued data for Y, M and C, and the shift register 7 is a 16-bit parallel-serial converter, the data length for one matrix becomes 2 bytes. Hence, data processing at the host apparatus side is further simplified from the viewpoint of software.

Instead of the dummy bits, effective multivalued data, such as black after UCR and the like, may, of course, be transmitted to the host apparatus. Whether or not these data are to be processed is determined according to the processing available at the host apparatus side.

Figures 1, 12:
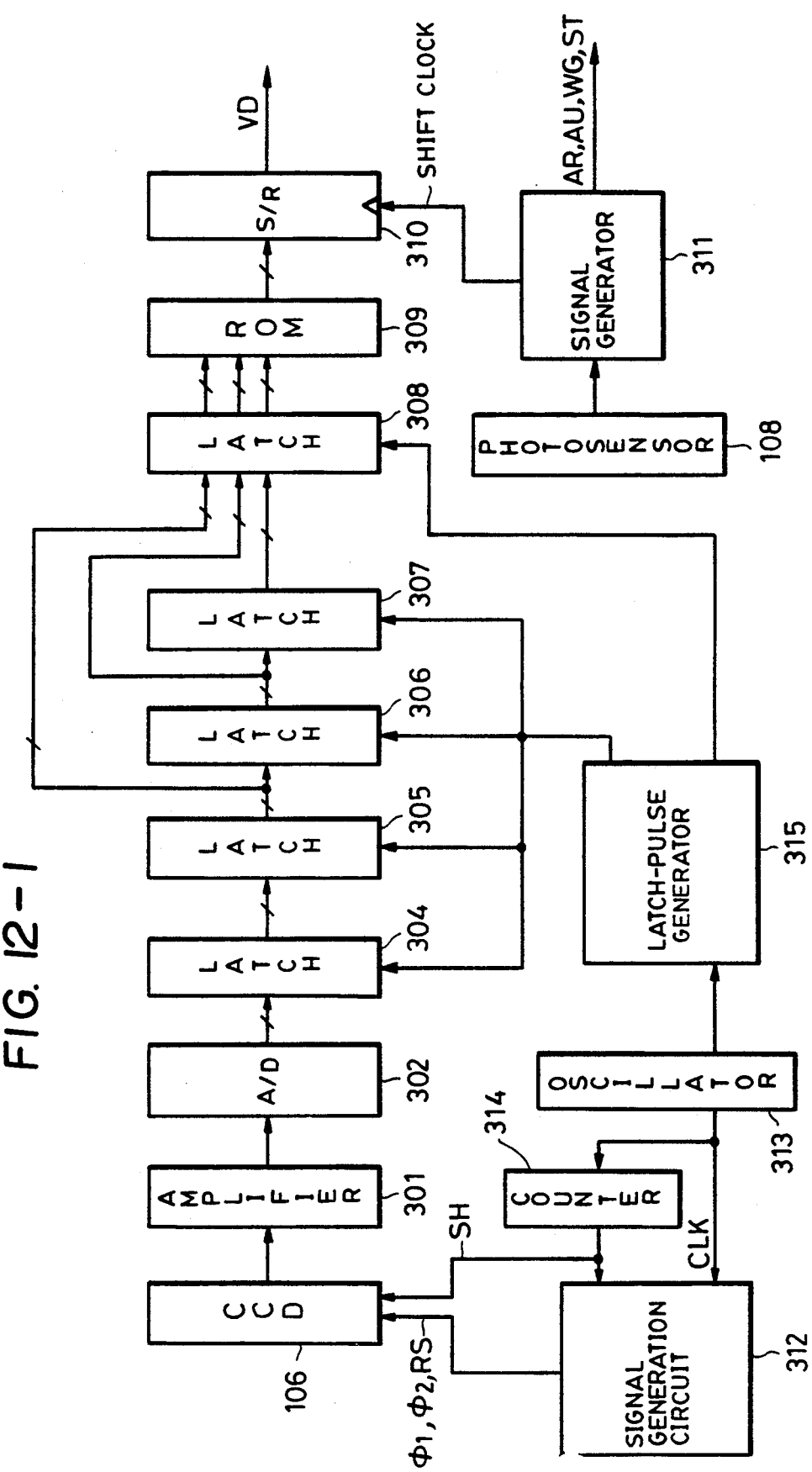
Figures 2, 12:
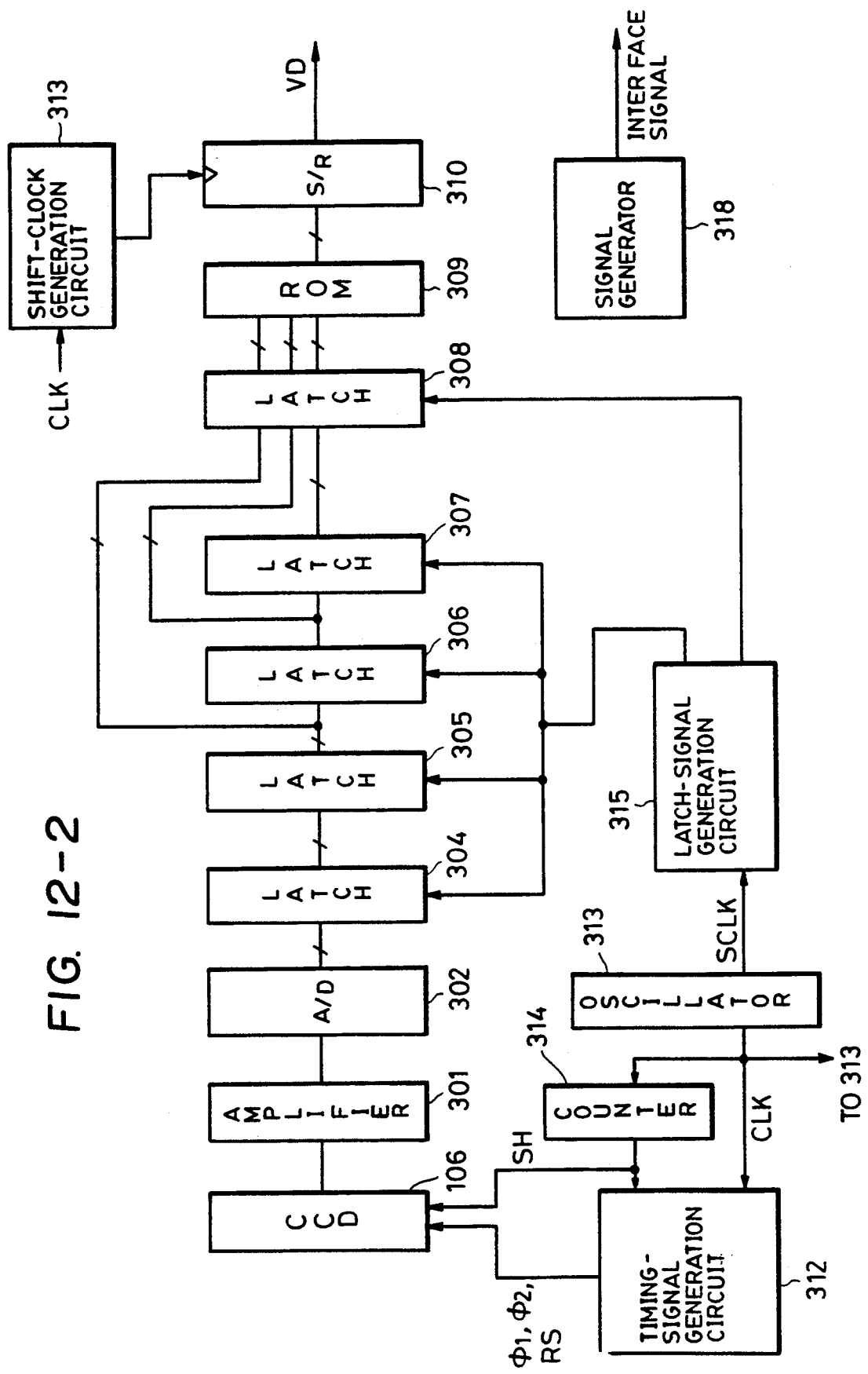

As explained above, according to the present embodiment, by providing a parallel-serial converter in a color-image reading apparatus, the output form of multivalued data of a color image is made identical to the output form of a binary image signal in the conventional black-and-white-image reading apparatus shown in FIG. 2. It is thereby possible to receive a color image signal without providing a new interface at the host apparatus side, but by performing only a little modification to the processing process of a conventional binary image signal. Furthermore, by having two systems, that is, a black-and-white image signal processing system and a color image signal processing system as an apparatus at the host apparatus side, that is, an apparatus at the reception side in the present embodiment, and by selecting between such two processing systems in accordance with a discrimination signal from the side of an image reading apparatus, either of a black-and-white-image reading apparatus and a color-image reading apparatus can properly process an image input signal. In addition, since the color-image reading apparatus in the present embodiment outputs an image signal in multiple values, most of the image processing for reproducing such a signal can be performed at the host apparatus side, and it is possible to configure an image processing circuit within the reading apparatus on an extremely small scale.

Since the color-image reading apparatus in the present embodiment makes the data length including each one unit of data each for C, M and Y, that is, three units of data in total in one data length, and sequentially outputs in units of data length, image processing taking correlation of C, M and Y at the host apparatus side can be performed for every data length, and processing is hence simplified.

The above-described configuration is particularly effective for a manual-scanning-type image reading apparatus having a small size and a simple configuration for reading an image by one reading operation.

Although, in the above-described embodiment, the level of dummy bits is utilized for transmitting a signal for discriminating whether the reading apparatus is a color-image reading apparatus or a black-and-white-image reading apparatus, the invention is not limited thereto. A dedicated signal bit for such discrimination may, for example, be provided, or communication may be performed between the image reading apparatus and the apparatus at the host apparatus side, and a signal identifying whether the reading apparatus is a color-image reading apparatus or a black-and-white-image reading apparatus may finally be transmitted to the host apparatus side in response to an inquiry from the apparatus at the host apparatus side.

As explained above, according to the present embodiment, when transmitting a color image which one has classified for every color component, a color signal is provided in a form identical to that of a black-and-white signal. Hence, an apparatus at the reception side can receive a color image without a need for a complicated and novel interface, but with a simple configuration.

Next, an embodiment of a hand-scanning-type color scanner to which the technique described with reference to FIGS. 1 through 10 can be applied will be explained.

Figure 11:
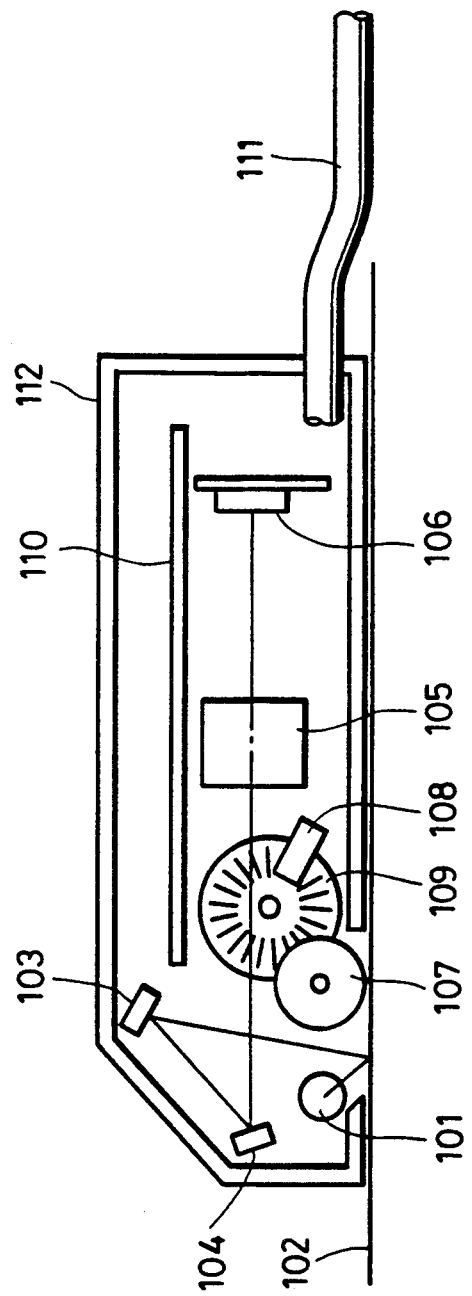
FIG. 11 is a diagram showing the configuration of an embodiment of the hand-scanning color scanner according to the present invention.

FIG. 11 is an internal configurational diagram showing the configuration of a hand-scanning color scanner to which the present invention is applied.

A reflected image of a manuscript 102 illuminated by a xenon cold-cathode tube 101 which emits white light and the light amount of which hardly fluctuates with temperature is reflected by cold mirrors 103 and 104 and imaged on a CCD color image sensor 106 via a lens 105.

The cold mirrors 103 and 104 transmit infrared light and reflect light within the visible range, cut unnecessary infrared light from the light reflected from the manuscript 102 by using two pieces, and further contribute to space saving by folding the light path in the form of the numeral "4". In addition, it becomes unnecessary to provide an infrared-cut filter on the image sensor 106.

As illustrated in the above-described FIG. 4, the CCD color image sensor 106 consists of a linear one-dimensional CCD sensor in which plural photosensors are aligned on a line, and red (R), green (G) and blue (B) filters 41, 42 and 43 are repeatedly attached for every picture element in the direction of the line.

A rubber roller 107 is rotatably mounted at a position contacting the surface of the manuscript, and is rotated in accordance with movement of the main body 112 of the color scanner by a human hand. A photosensor 108 is obturated by an encoder plate 109 rotating in accordance with the rotation of the rubber roller 107, and generates pulse signals in accordance with the passage of plural slit units provided at the encoder plate 109.

Hence, from the photosensor 108, pulse signals are generated with a generation interval corresponding to the moving speed of the main body of the color scanner.

A circuit substrate 110 incorporates an image processing unit and the like. A signal cable 111 transmits image signals to external apparatuses, such as a word processor, a personal computer and the like.

The main body 112 of the hand-scanning color scanner is provided in a form suitable for hand scanning, weights about 400 g, and hence can be easily moved by a human hand.

According to the above-described configuration, by repeatedly performing main-scanning driving of the CCD color image sensor 106, and performing subscanning movement of the main body 112 of the color scanner in a direction nearly perpendicular to the main scanning direction of the CCD color image sensor 106 by a human hand, a color image is read in color separation over a desired length with a width of about 60 mm. The main body of the scanner is configured in a form easy to grasp with a hand.

FIG. 12-1 is a block diagram of an electric circuit relative to image reading provided at the circuit substrate 110 of the color scanner illustrated in FIG. 11. Although FIG. 12-1 resembles FIG. 1, there are some differences. Hence, each unit will be explained.

A timing-signal generation circuit 312 generates signals for driving the CCD color image sensor 106. A system clock CLK having a predetermined period and shift pulses SH are supplied from an oscillator 313 and a counter 314 which counts the system clock CLK, respectively.

An amplifier 301 amplifies analog image signals of the CCD color image sensor 106. An A/D converter 302 converts the analog image signals amplified by the amplifier 301 into digital image signals for every picture element. Latches 304–307 sample digital picture-element signals serially output from the A/D converter 302 for the data of each picture element. A latch 308 samples output data of the latches 304–307 for every 4 picture elements. A ROM 309 outputs image signals for each color, yellow (Y), magenta (M), cyan (C) and black (Bk), corresponding to output data of the latch 308. A shift register 310 converts image signals for each color, Y, M, C and Bk, output from the ROM 309 into serial data. A signal generator 311 incorporates an oscillator and a counter, and generates shift signals for various interfaces with predetermined timings. The signal generator 311 also has a function to convert pulses generated by photosensor 108 into TTL levels and to output them as a subscanning synchronizing signal ST.

A latch-pulse generator 315 inputs the system clock CLK and generates latch pulses for having the latches 304–308 perform latch operations.

Signals read by the CCD color image sensor 106 provided with filters consisting of R, G and B as shown in FIG. 4 are treated by making three picture elements for R, G and B a set. The ROM 309 outputs each set of data (picture element) for Y, M, C and Bk corresponding to an area for continuous three picture elements of the CCD color image sensor 106 by one manual scanning.

Figure 13:
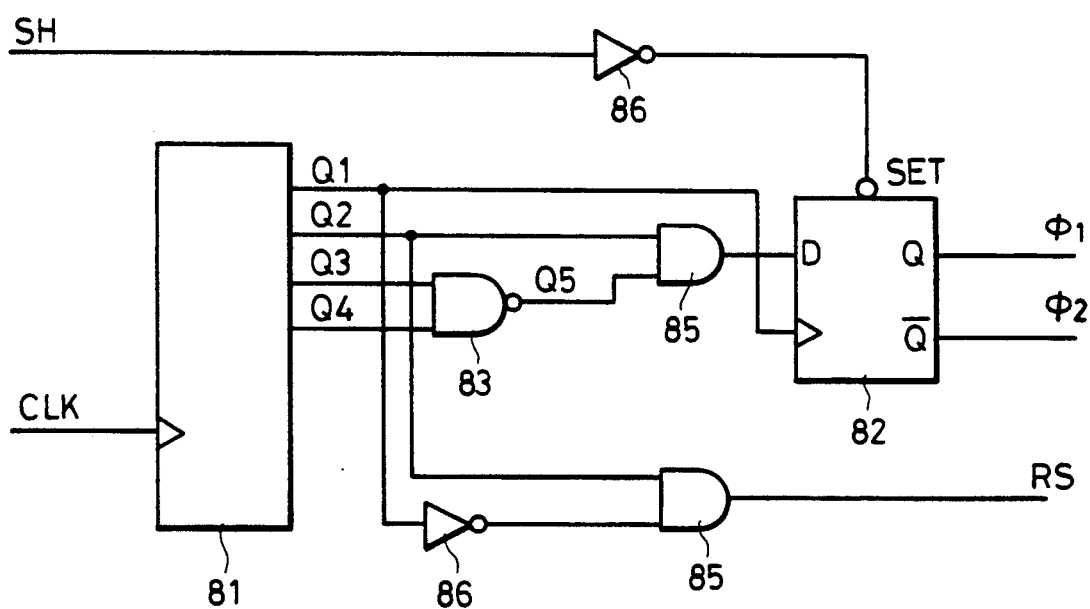
FIG. 13 is a block diagram of a driving-pulse generation circuit.

FIG. 13 is the configurational diagram of the timing-signal generation circuit 312 shown in FIG. 12-1 which generates transfer clocks $\phi 1$ and $\phi 2$ and a reset signal RS for driving the CCD color image sensor 106. In FIG. 13, there are shown a 4-bit counter, such as 74LS163 of TI Corp. or the like, a D-type flip-flop 82 with a SET terminal, such as 74LS74 of TI Corp. or the like, a NAND gate 83, and AND gate 85, and an inverter 86. The shift pulses SH from the counter 314 and the system clock CLK from the oscillator 313 are input to the timing-signal generation circuit 312, and the transfer clocks $\phi 1$ and $\phi 2$ and the reset signal RS are produced with timings as shown in FIG. 14.

Figure 14:
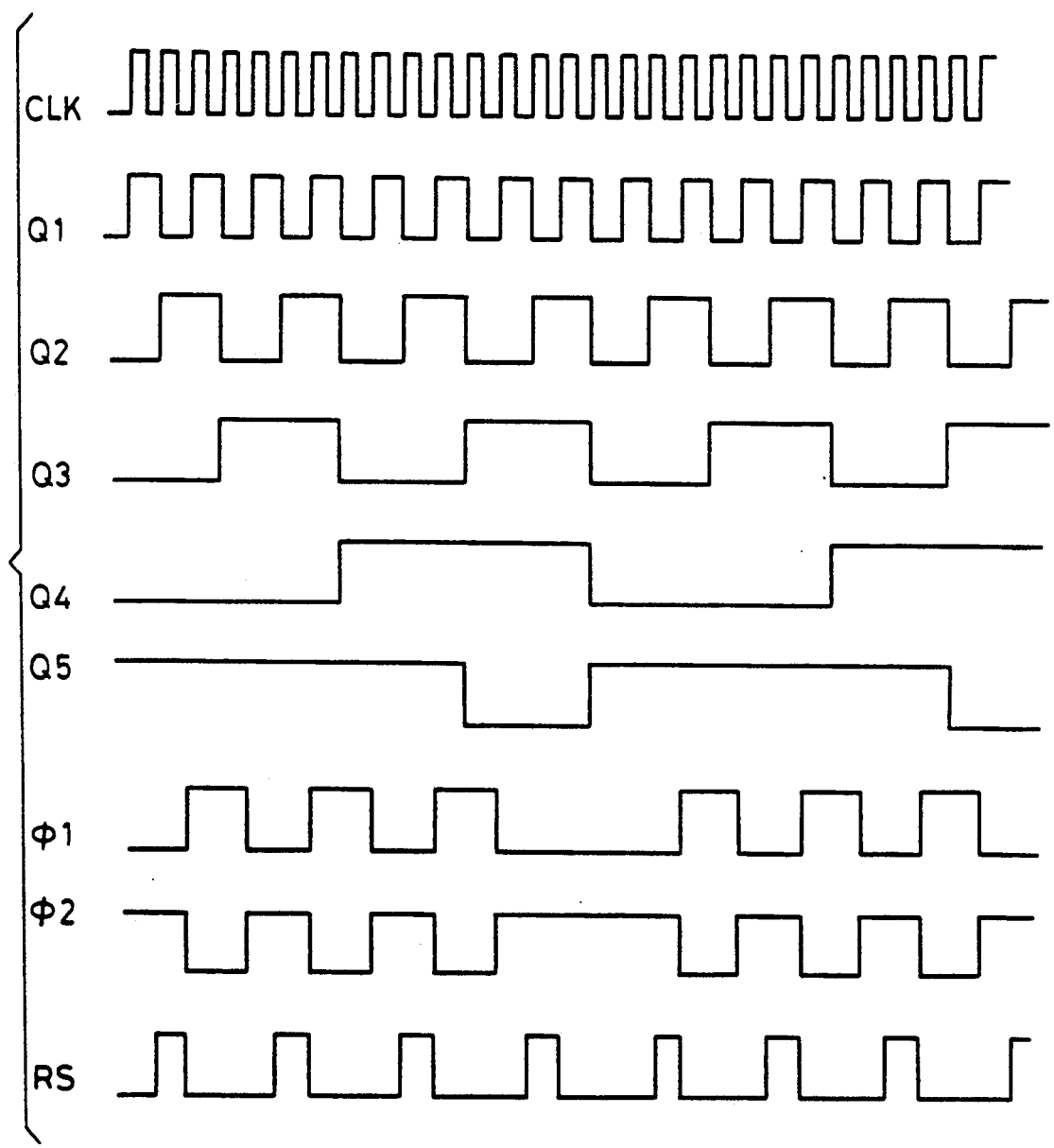
FIG. 14 illustrates timing charts for signal generation for each unit in the circuit in FIG. 13.

As is apparent from FIG. 14, the transfer clocks $\phi 1$ and $\phi 2$ are pulse trains in which one pulse is omitted for every 4 pulses, and the reset signal RS is a pulse train which is constantly generated with a predetermined period without intervals.

Figure 15:
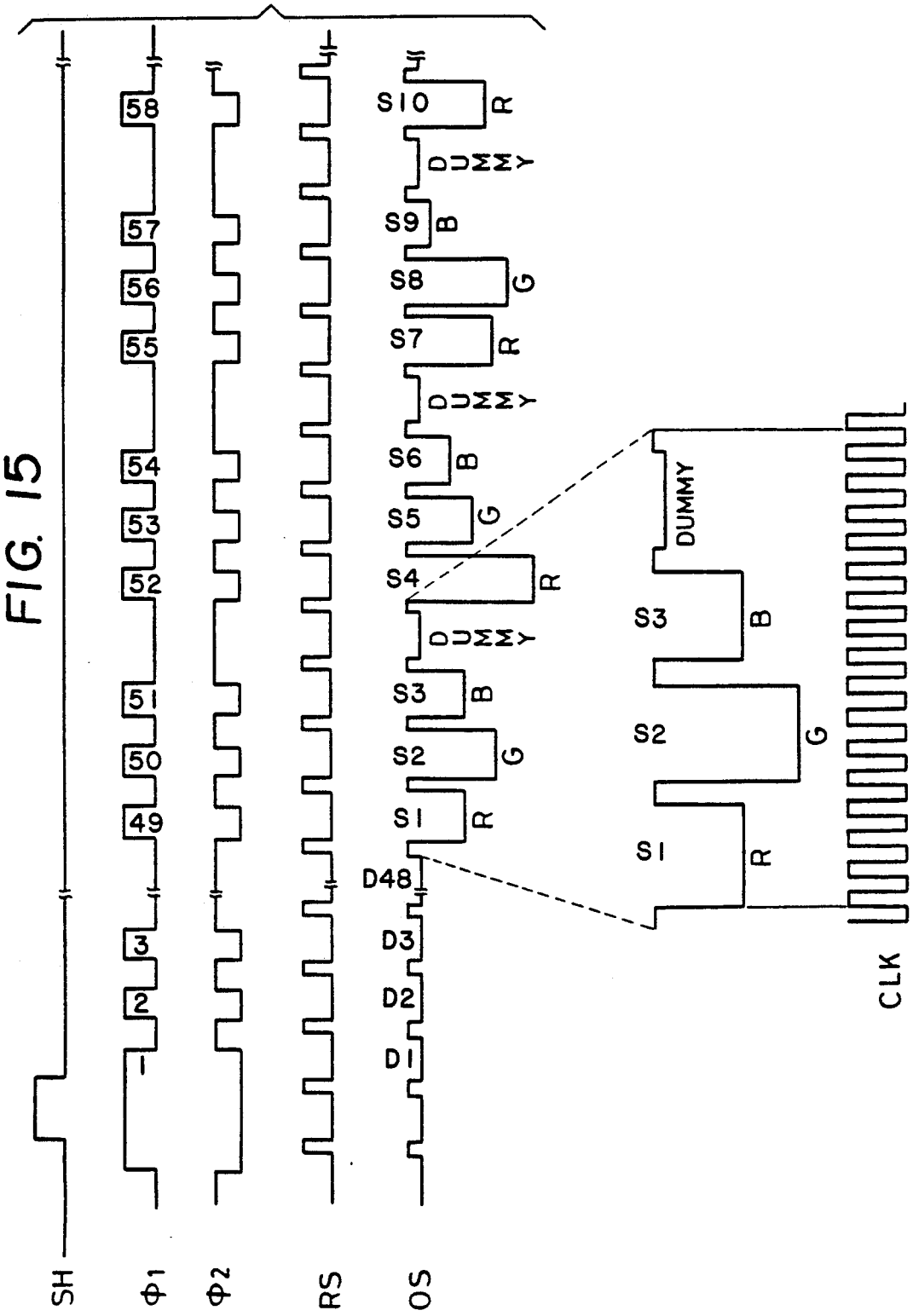
FIG. 15 is a diagram showing driving pulses for a CCD sensor.

Accordingly, if the CCD color image sensor 106 is driven using such transfer clocks $\phi 1$ and $\phi 2$ and reset signal RS, dummy data (corresponding to the black level) for one picture element appear at an output terminal OS of the CCD color image sensor 106 every time a picture-element signal (R, G and B) for three picture elements is output, as shown in FIG. 15. That is, the shift operation of the shift register within the CCD image sensor is performed three times successively and then stops briefly.

Color image signals obtained by reading a color image by means of the CCD color image sensor 106 driven by such timing signals are sequentially output in the main-scanning direction, amplified by the amplifier 301, and then input to the A/D converter 302 to be converted into 5-bit digital image signals for every picture element. Data (R, G, B and dummy) for 4 continuous picture elements including a dummy picture element are then held by the latches 304–307, and among these data, data R, G and B for 3 picture elements latched in the latches 307, 306 and 305 are input to the latch 308. Latch timings of the latches 304–307 and the latch 308 are as shown in FIG. 16, and latching by the latch 308 is performed after the dummy picture element has been latched by the latch 304. Accordingly, continuous picture-element data for R, G and B are simultaneously input to predetermined addresses in the ROM 309.

The ROM 309 simultaneously converts and outputs multi-valued data consisting of 4 bits for each color, Y, M, C and Bk, that is, 16 bits in total, in a form including all of complementary conversion, masking and the like, in accordance with data for R, G and B input according to table data previously written during an idle time for one picture element by the dummy data. In the embodiment shown in FIG. 12-1, 16-bit parallel data output from the ROM 309 are subjected to a bit allocation as in FIG. 17. The parallel data are converted into serial data VD from the significant bits by the 16-bit shift register 310 and are output.

The timing of the shift clock of the shift register 310 and the output timing of the shift register 310 are as shown in FIG. 16.

As can be understood from the relationship between image data and the system clock CLK shown in FIG. 15, the shift clock of the shift register 310 as a data transfer clock to the outside can be easily produced from the system clock CLK. As described above, the CCD color image sensor 106 is always driven with a predetermined period irrespective of the movement of the hand-scanning scanner, and data illustrated in FIG. 16 are always output from the shift register 310.

By adopting the driving method of the CCD image sensor as explained above, it is possible to efficiently transmit 4×4 dot matrix data consisting of each one data for Y, M, C and Bk, that is, 4 bits in total, with reading each one data for R, G and B, that is, 3 bits in total, without providing a second oscillation circuit for data transfer separately from the system clock.

Furthermore, since a signal corresponding to the black level is always input within 4 picture elements to the output of the amplification unit 603, the signal resembles a DC signal only when a black manuscript is read, even if a state in which the magnitudes of signals for R, G and B are uniform continues.

Since the signal level at this time is zero, the image signal is not adversely influenced even if noise removal is excessively performed at the DC-cut unit 604. Accordingly, excellent noise removal is performed from the white level to the black level.

As explained above, since control is performed so that the sensor is driven with periodic omission of a clock pulse for transferring electric charges in the analog shift register for the image sensor, it is possible to efficiently transmit processing signals, performing processing on the read signals upon the reading for each picture element for R, G and B, that is, 3 data in total, without adding an oscillation circuit for data transfer separately from the system clock.

Accordingly, the clock of the oscillator 313 can be used as the shift clock of the shift register 310, as shown in FIG. 12-2.

FIG. 12-2 is a modified example of FIG. 12-1, and FIG. 12-2 differs from FIG. 12-1 in that the shift clock is directly obtained from the oscillator 313.

Respective 4-bit signals for C, M, Y and Bk are subjected to serial-parallel conversion at the external apparatus side, and processed as data for the number of dots to be plotted within a 4×4 dot matrix.

From the signal generator 311, interface signals AR, AU and WG and a subscanning synchronizing signal ST are output to an external apparatus in synchronization with the output of the serial data VD from the shift register 310. The output states of the interface signals AR, AU and WG and the serial data VD are shown in FIG. 18.

In FIG. 18, the signal AR is a signal indicating the head or beginning of main scanning, the signal AU is a synchronizing signal for main scanning, and the signal WG is a timing signal for the taking in of data.

The external apparatus side processes data from the AR, immediately after the rise of the signal ST has been detected, to the next AR, as effective data for one line.

That is, as described above, the CCD color image sensor 106 is always driven with a predetermined period irrespective of whether or not the main body 112 of the scanner is moving. The serial data VD representing the read image is thereby supplied to the external apparatus always with a predetermined period and a predetermined speed together with the interface signals AR, AU and WG, as shown in FIG. 18.

Accordingly, the serial data VD are supplied to the external apparatus even when the main body 112 of the scanner is not being moved. However, the serial data VD supplied in a state in which the main body 112 of the scanner is not moving is unnecessary for the external apparatus side.

Hence, in the present embodiment, the subscanning synchronizing signal ST produced from a pulse signal generated from the photosensor 108 in accordance with the movement of the main body 112 of the scanner is supplied to the external apparatus. It thereby becomes possible for the external apparatus to take in and process the serial data VD input after the subscanning synchronizing signal ST has been input as effective image data obtained by reading when the main body 112 of the scanner is being moved.

According to the configuration and signal form of the embodiment as explained above, it is possible to realize a compact color-image reading apparatus which converts the image of a color manuscript into color image signals by a single manual scanning. Furthermore, since transmission of color image signals is performed in parallel with read scanning, a memory for storing color image signals, such as a RAM or the like, is unnecessary. In addition, the capacity of a ROM used as an image processing circuit need be no more than about 512K bits because the number of bits of input addresses is small.

Moreover, the processing for performing color separation of a color image to form color image signals is always carried out with a predetermined period irrespective of the movement of the main body of the scanner to repeatedly output color image signals, and a predetermined signal (subscanning synchronizing signal ST) indicating an effective signal among color image signals repeatedly output is output. An effective color image signal is thereby taken into an external apparatus.

Accordingly, it is not necessary to change the operation timing of the CCD color image sensor or the speed of the color processing circuit in accordance with the moving speed of the main body of the scanner and the like. It becomes therefore possible to stably perform read processing of a color image always in the best conditions even for a hand-scanning scanner with which moving speed is not constant, and it becomes possible to output excellent color image signals.

It is also possible to synchronize the storage timing of the CCD color image sensor and the operation of the processing circuit according to pulses from the photosensor corresponding to the movement of the main body of the scanner. In this case, color image signals are output at an interval corresponding to the moving speed of the main body of the scanner to an external apparatus. Accordingly, in this configuration as well, by outputting the above-described subscanning synchronizing signal ST to an external apparatus, the external apparatus can securely taken in effective color image signals for color image signals which are randomly input.

Although, in the above-described embodiment, pulse signals corresponding to the movement of the main body of the scanner relative to the manuscript are produced according to the roller which rotates contacting the manuscript, the invention is not limited thereto, but pulses may be produced by other kinds of encoders. Pulses may also be produced by a configuration in which a predetermined pattern is provided on the surface of a manuscript and the pattern is read by a photosensor.

Furthermore, other than the CCD color image sensor provided with three-color filters for R, G and B, color image sensors having other filter configurations may, of course, be used.

In addition, color-component signals themselves which the CCD color image sensor can read may be output to an external apparatus without color conversion.

As explained above, according to the present embodiment, it is possible to provide a hand-scanning color scanner which can excellently read a color image and output excellent color image signals even if moved by a human hand with an arbitrary timing and an arbitrary speed.

Next, an explanation will be provided for a color-image reading apparatus which can correct for variations in light transmittance or sensitivity of filters for R, G and B in a photoelectric conversion unit.

Figure 19:
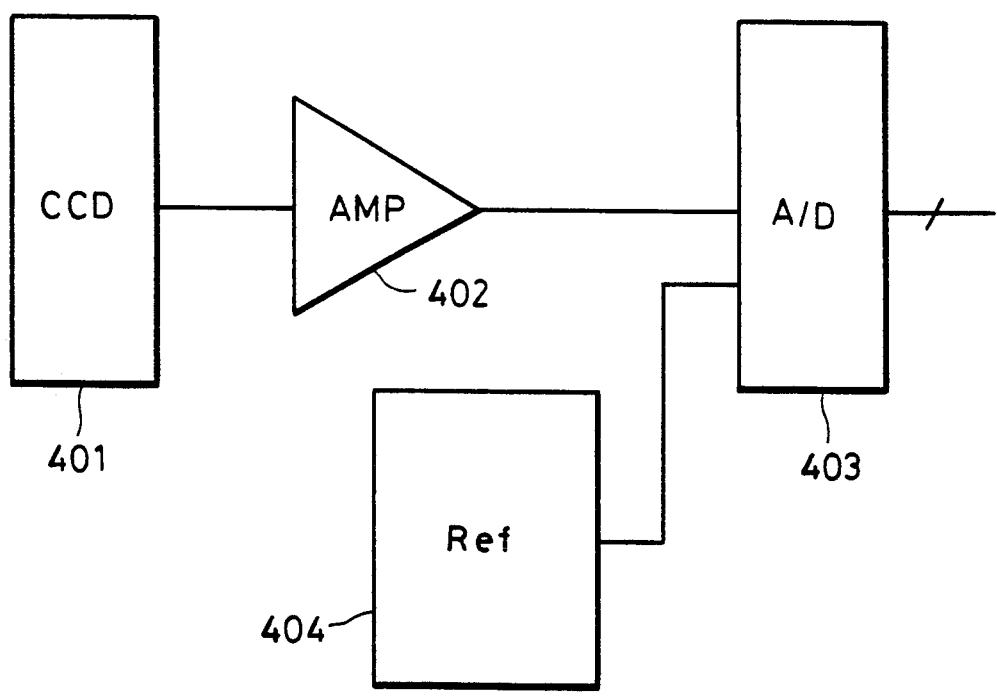
FIG. 19 is a block diagram showing the configuration of a color-image reading apparatus according to a third embodiment of the present invention.

FIG. 19 is an electric block diagram of the above-described color-image reading apparatus. In FIG. 19, a CCD color image sensor 401 having striped filters for R, G and B reads a color image. An amplifier 402 amplifiers analog image signals of the CCD color image sensor 401. An A/D converter 403 converts analog image signals amplified by the amplifier 402 into digital image signals, and is, for example, HA19216 of Hitachi Ltd. A reference signal generation circuit 404 generates a reference voltage for the A/C converter 403.

As shown in FIG. 4 and described previously, the CCD 401 has a configuration in which an R filter 41, a G filter 42 and a B filter 43 are sequentially attached for every picture element in succession of plural photosensors aligned in the main scanning direction.

A signal read by the CCD sensor 401 is a serial signal in which plural color signals corresponding to the alignment of the filters, as R, G, B, R, G, B, etc., are mixed, that is, a dot sequential signal. Three consecutive picture elements, one each for R, G and B, are treated as one set, and one unit of data each for Y, M and C, corresponding to an area for three picture elements, are produced.

Next, the operation of the embodiment will be explained.

A color image signal illuminated by a white illuminating light source is photoelectrically read by the CCD sensor 401, and respective color signals for R, G and B transmitting through the respective filters for R, G and B are sequentially output along the main scanning direction, amplified by the amplifier 402, and then input to the A/D converter 403 having a resolution of 5 bits. Two kinds of reference voltages $V_T$ and $V_B$ are input to the A/D converter 403 from the reference generation circuit 404. That is, when the input signal voltage from the amplifier 402 is $V_T$, the A/D converter 403 outputs 31 (11111), and when the input signal voltage is $V_B$, the A/D converter 403 outputs 0 (00000). That is, the input voltage between $V_B$ and $V_T$ is subdivided into $(V_T-V_B)/31$ to represent 31 gradations.

The gain of the amplifier 402 is set so that the output voltage of a G picture element becomes $V_g$ when a white manuscript is read. At this time, the output voltages of an R picture element and a B a picture element from the amplifier 402 when the white manuscript is read with the above-described gain are $V_r$ and $V_b$, respectively. The magnitude relationship is $V_r > V_g > V_b$.

As the output voltage when a black manuscript is read, the voltage $V_r$ is output for R, for G and for B.

Figure 20:
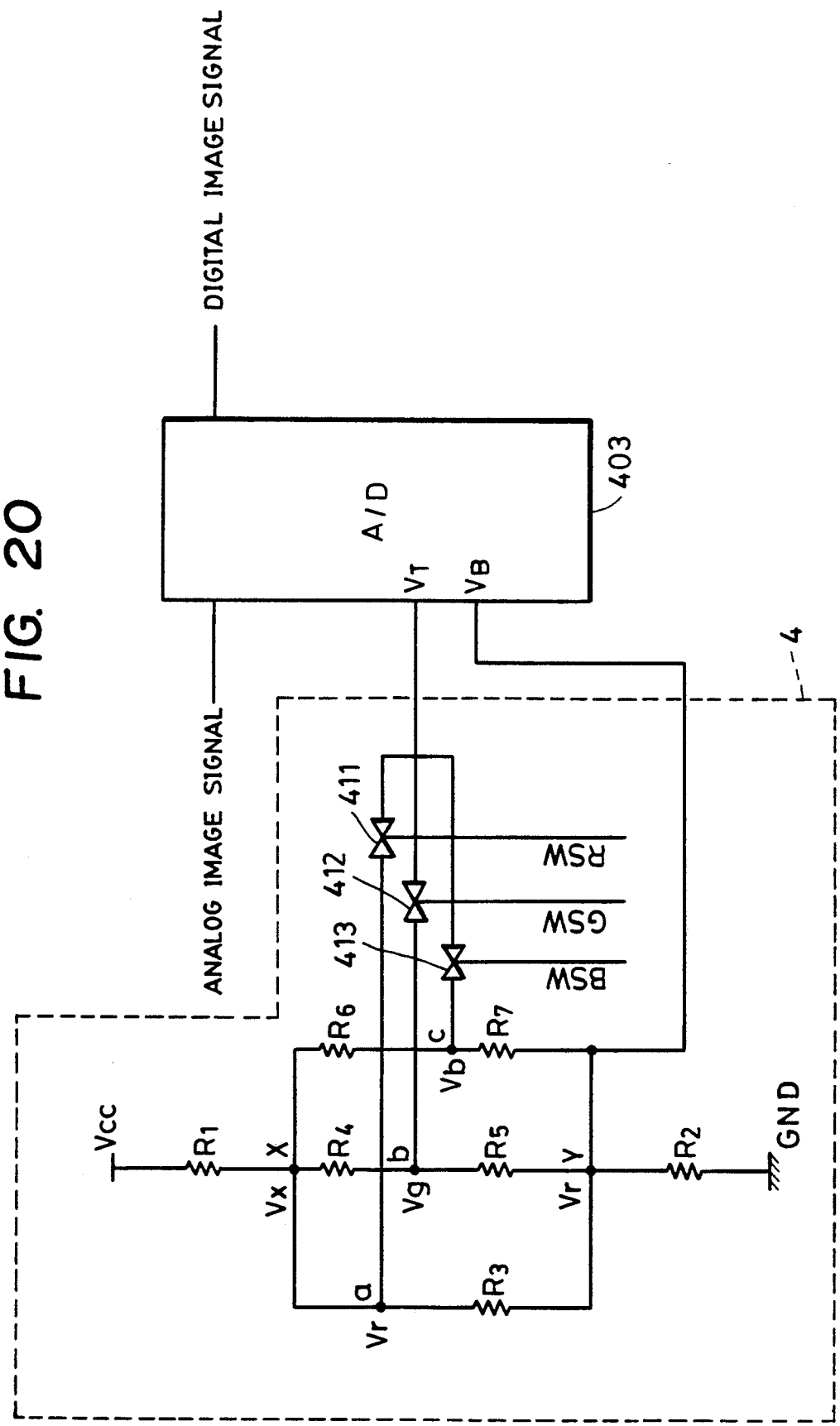
FIG. 20 is a block diagram of a reference generation circuit.

The configuration of the reference generation circuit 404 for generating the reference voltages $V_B$ and $V_T$ to be input to the A/D converter 403 is shown in FIG. 20.

Figure 21:
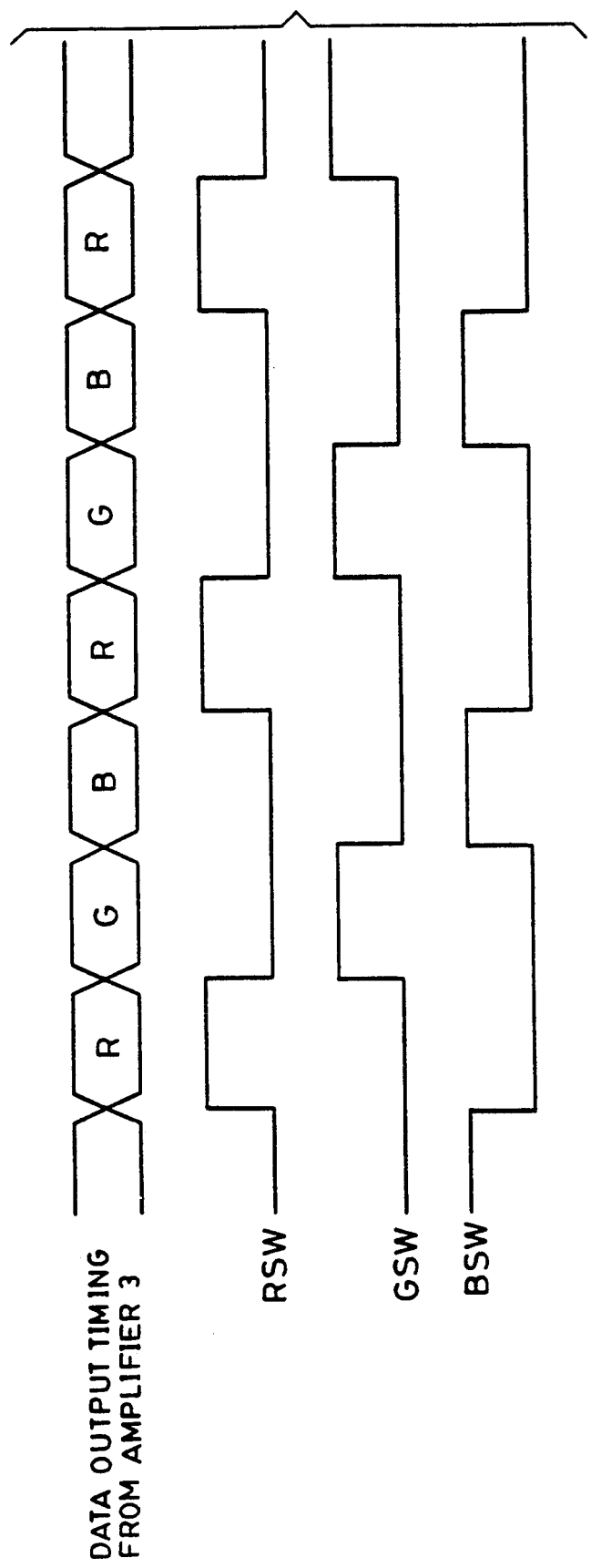
FIG. 21 is a diagram showing switching of a reference voltage.

In FIG. 20, analog switches 411–413, which are, for example, TC4566F of Toshiba Corporation, are subjected to switching control by control signals RSW, GSW and BSW. Timing pulses of the control signals RSW, GSW and BSW for controlling switching of the analog switches 411–413 are as shown in FIG. 21.

The values of resistances $R_1$-$R_7$ are set so that potentials at points X, Y, a, b and c are $V_x$, $V_y$, $V_r$, $V_g$ and $V_b$, respectively, where $V_x=V_r$ and $V_y=V_B$.

That is, when the signal of an R picture element is subjected to A/D conversion, the analog switch 411 is closed by the control signal RSW, and the voltage $V_r$ is input to a $V_T$ input terminal of the A/D converter 403. Similarly, when the signal of a G picture element is subjected to A/D conversion, the analog switch 412 is closed by the control signal GSW, and the voltage $V_g$ is input to the $V_T$ input terminal. When the signal of a B picture element is subjected to A/D conversion, the analog switch 413 is closed by the control signal BSW, and the voltage $V_b$ is input to the $V_T$ input terminal.

Figure 22:
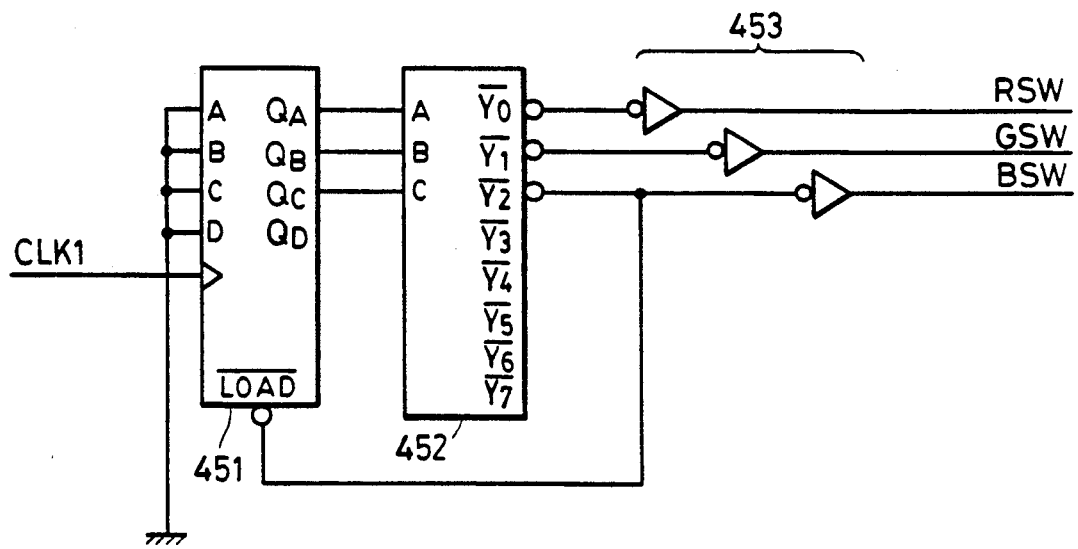
FIG. 22(a) is a block diagram of a control-signal generation circuit.
FIG. 22(b) illustrates timing charts showing the generation of control signals.
Figure 22:
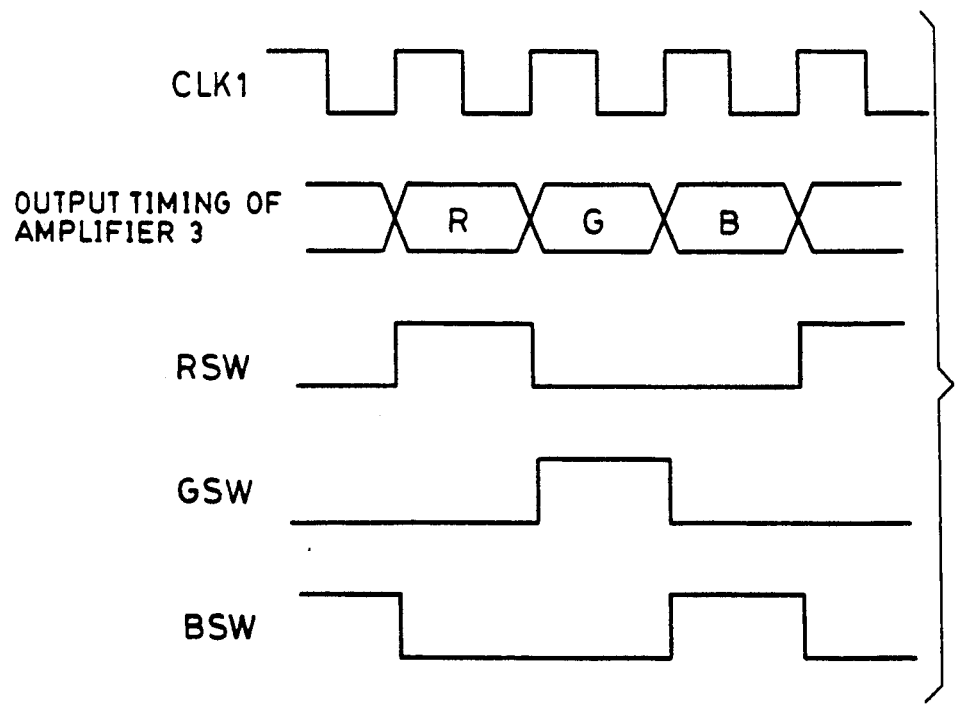
Figure 23:
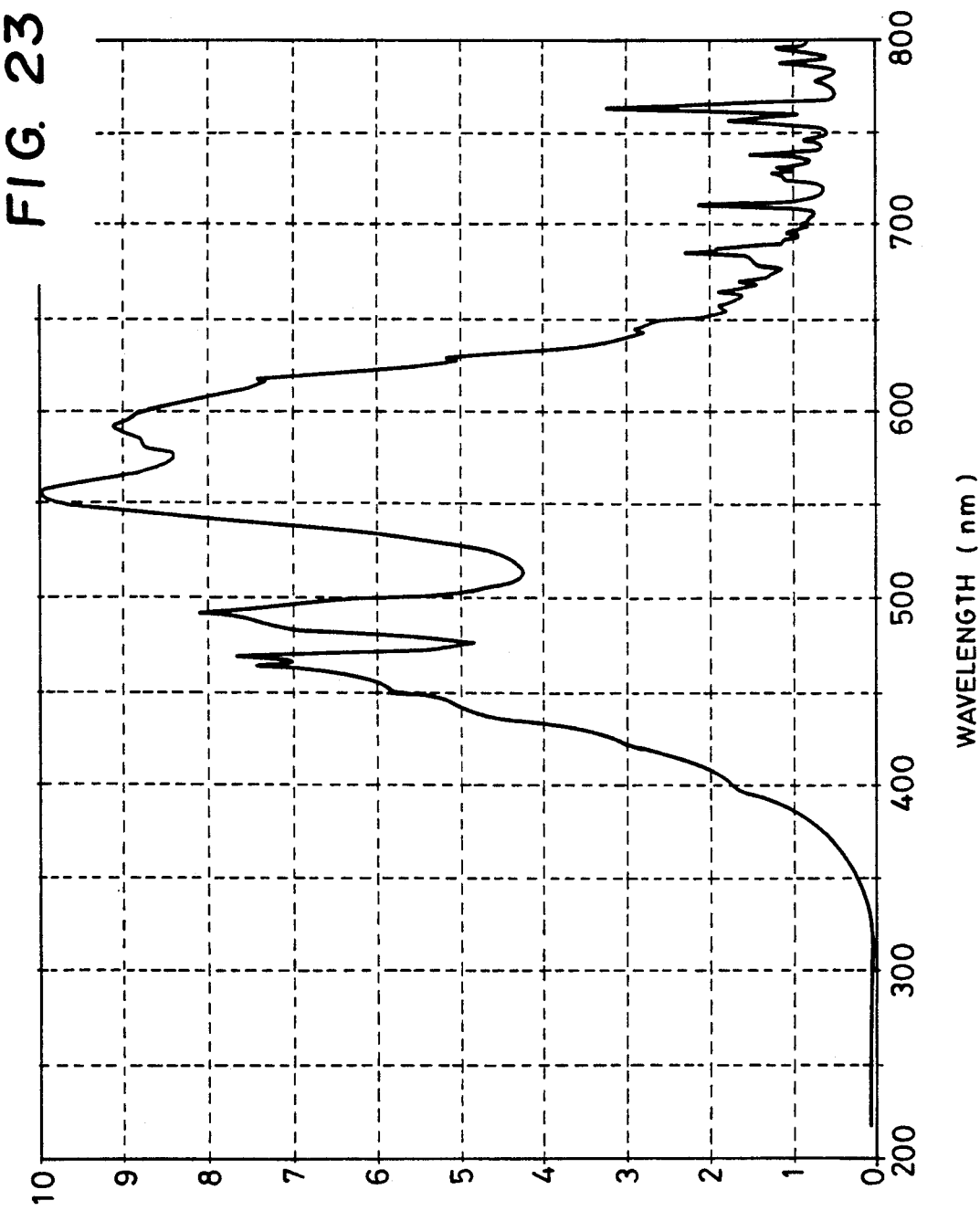
FIG. 23 is a diagram showing the spectral distribution of a white illuminating light source.
Figure 24:
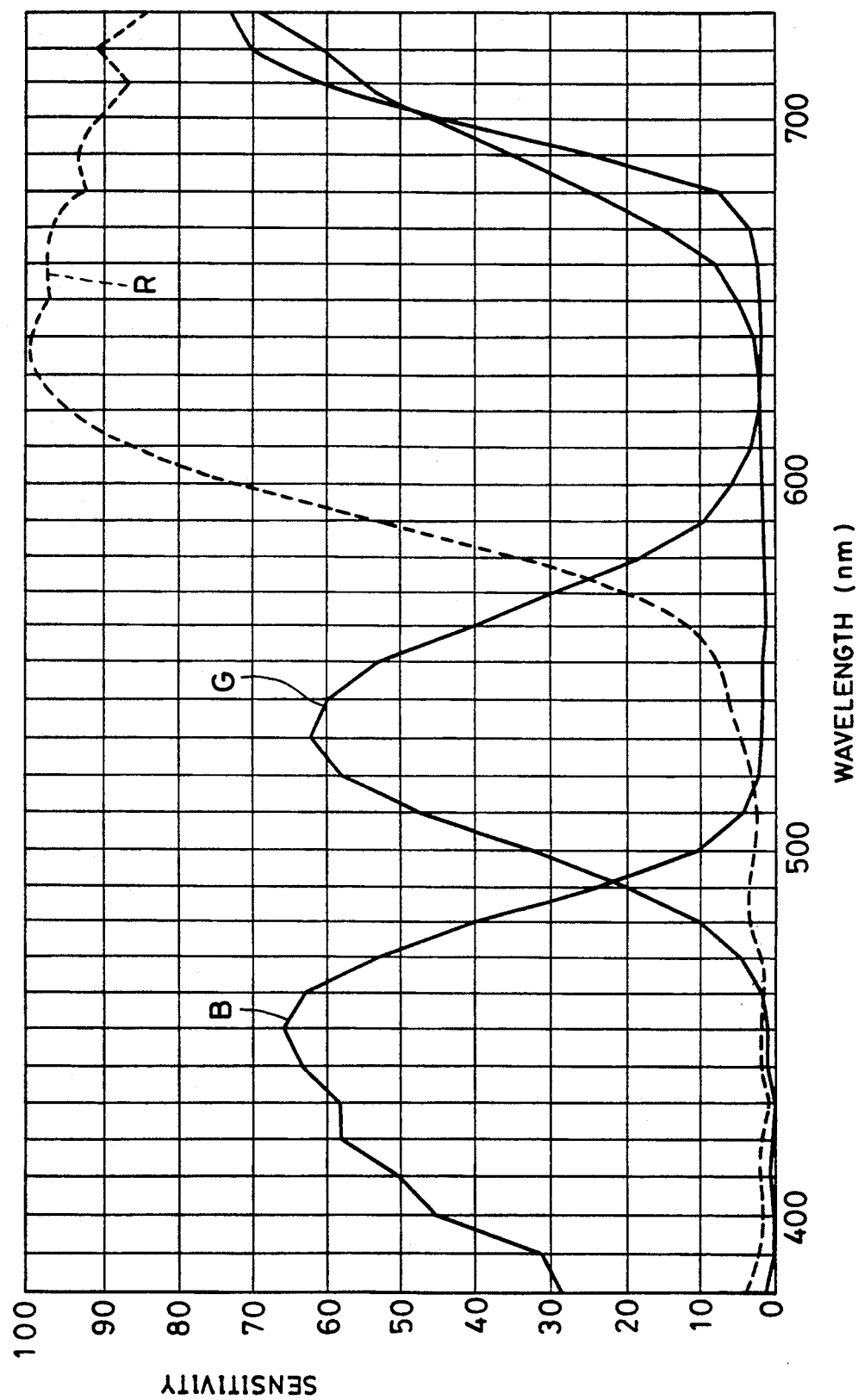
FIG. 24 is a diagram showing the sensitivity for wavelength of each picture element for R, G and B of the CCD 1.
Figure 25:
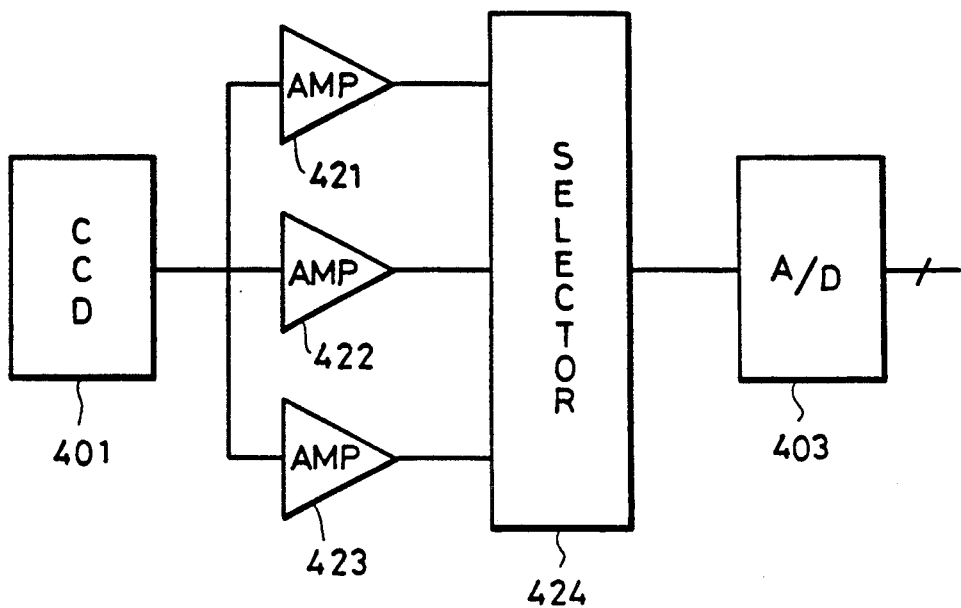
FIG. 25 is a block diagram of a correction circuit.
Figure 26:
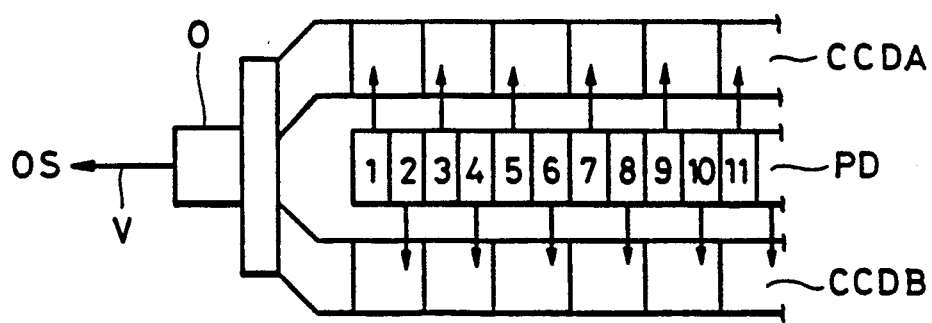
FIG. 26 is the configuration diagram of a line sensor.
Figure 27:
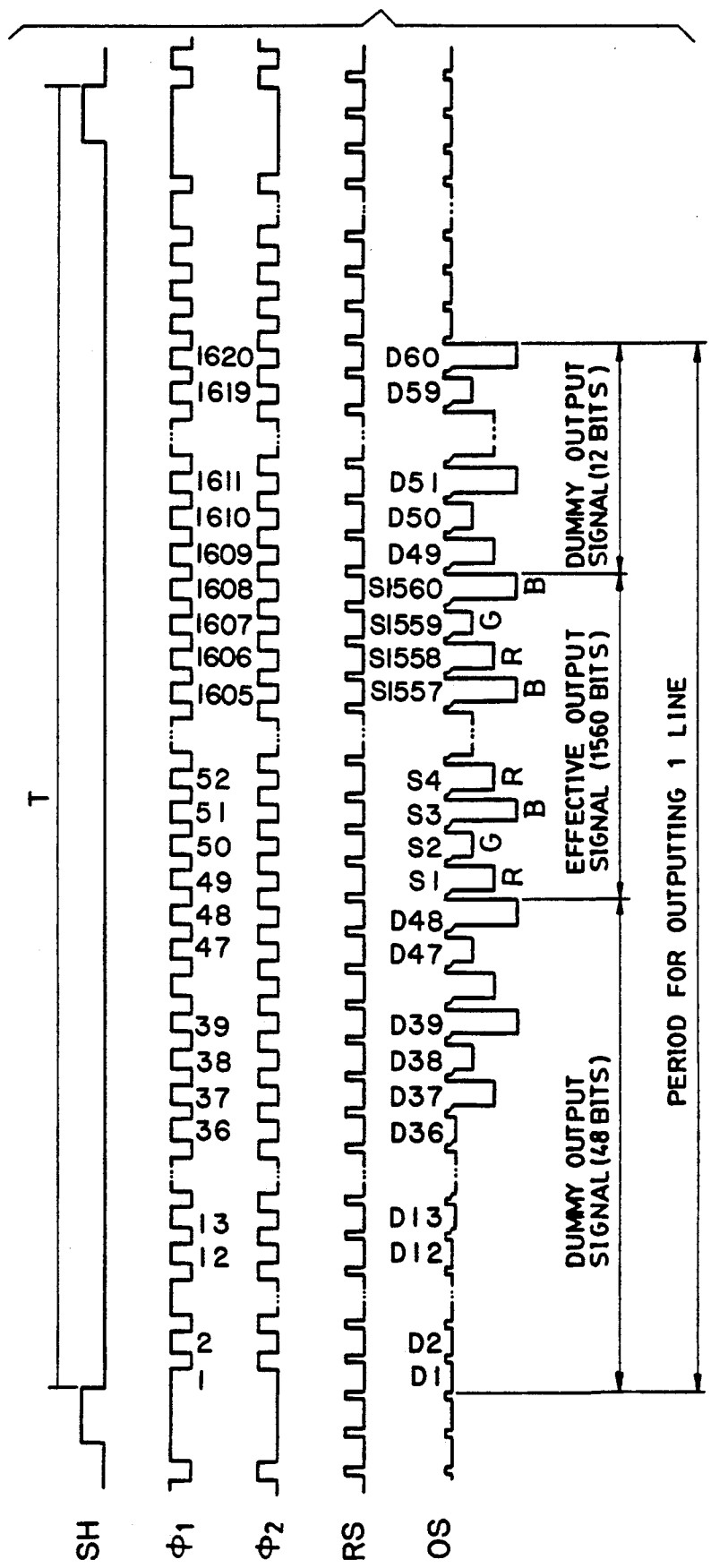
FIG. 27 illustrates timing charts for driving pulses in a conventional sensor.
Figure 28:
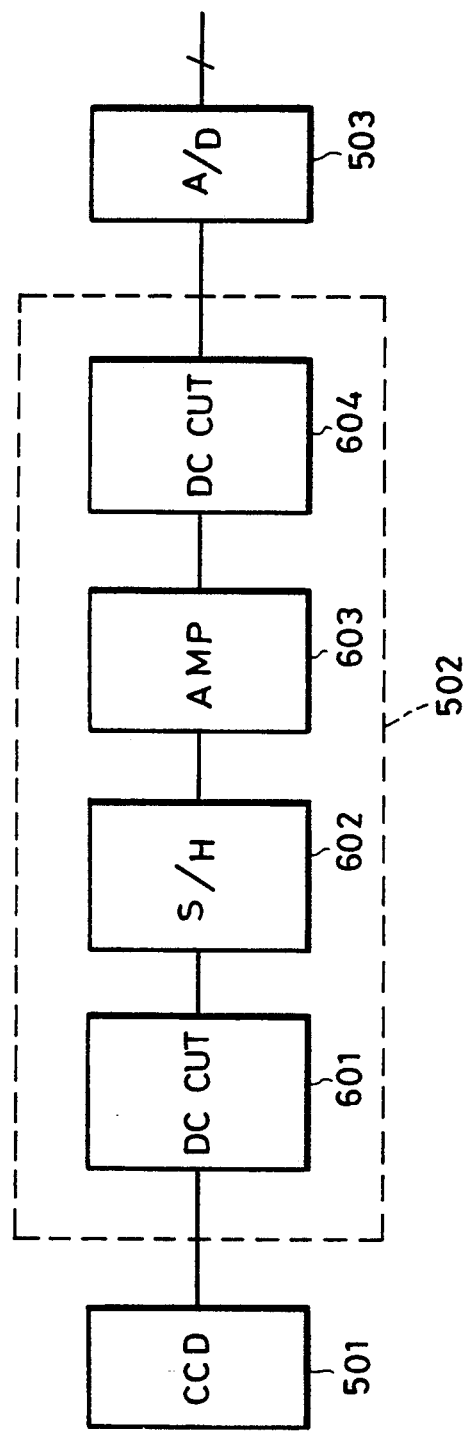
FIG. 28 is a diagram for explaining an analog signal processing.

The control signals RSW, GSW and BSW are produced by a circuit shown in FIG. 22(a). The circuit comprises a 4-bit counter 451 which is, for example, 74LS163 of TI Corp. or the like, a 3:8 decoder 452 which is, for example, 74LS138 of TI Corp. or the like, and inverters 453 which are, for example, 74LS04 of TI Corp. or the like.

A clock CLK1 synchronizing with each picture element of R, G and B signals from the amplifier 403 is input to the 4-bit counter 451. Output terminals $Q_A$, $Q_B$ and $Q_C$ of the 4-bit counter 451 are input to A, B and C terminals of the decoder 452, respectively. At this time, an output $Q_D$ is open. Outputs $\overline{Y}_0$, $\overline{Y}_1$ and $\overline{Y}_2$ of the decoder 452 are inverted by the inverters 453. At this time, outputs $\overline{Y}_3$-$\overline{Y}_7$ are open. The output $\overline{Y}_2$ is input to a $\overline{LOAD}$ terminal of the counter 401, and the load value 0000 is subjected to LOAD in synchronization with the CLK1. As shown in FIG. 22(b), the RSW, GSW and BSW, which are outputs of the inverter 453, are output corresponding to R, G and B signals from the amplifiers 453, respectively.

By performing such a control, three-color digital data corresponding to R, G and B fliers output from the A/D converter 403 can be all treated as gradation signals having 32 gradations.

These gradation signals are input, for example, to an image processing circuit (not illustrated), subjected to appropriate processings, such as complementary-color conversion, masking and the like, and are output to the outside of the apparatus as print data for Y, M and C.

As explained above, by setting reference voltages of the A/D converter adjusted to signal levels for R, G and B, respectively, when analog image signals of the CCD color image sensor are subjected to A/D conversion, and by switching the reference voltage corresponding to a picture element for R, G and B every time an image signal is input, all picture-element levels can be represented by 32 gradations.

Since the setting range of the reference-voltage input terminal of the A/D converter has in general an allowance of about ±50% of the input dynamic range $V_T$-$V_B$ relative to a recommended voltage setting value, the conversion accuracy of the A/D converter does not fluctuate if it is configured so that the reference voltage is switched within that range.

As explained above, according to the embodiment which has been explained with reference to FIGS. 19–22, when analog image signals for plural colors obtained by reading the image of a manuscript in color separation are subjected to A/D conversion, all color image signals can be treated as digital data having equal gradations with a simple configuration by switching the reference voltage of the A/D converter with being adjusted to each color signal. Hence, image processing including color separation can be excellently performed.

The above-described A/D converter shown in FIGS. 19-22 can be applied to the A/D conversion units shown respectively in FIG. 3 and FIG. 12. Although, in the present embodiment, the circuit shown in FIGS. 19-22 has been applied for the processing of color image signals output from the line sensor having the configuration shown in FIG. 4, the present invention is not limited thereto, but may also be applied to other color sensors, for example, an area sensor. Furthermore, although R, G and B filters have been used as the color filters, the present invention may also be applied to sensors having other various kinds of filters, for example, complementary-color filters for Y (yellow), G (green) and C (cyan).

What is claimed is:

1. An image processing apparatus comprising:
   a) photoelectric conversion means for converting an object color image into color image signals;
   b) serial conversion means for converting the color image signals provided by said photoelectric conversion means into a serial signal; and
   c) means for outputting the serial signal from said serial conversion means in parallel with a synchronizing signal, wherein the synchronizing signal has a frequency equal to that which a synchronizing signal for a monochrome signal would have.

2. An image processing apparatus according to claim 1, wherein the color image signals are R, G and B signals.

3. An image processing apparatus according to claim 1, wherein said serial conversion means is for converting the R, G and B signals into Y, M and C signals.

4. An image processing apparatus according to claim 1, wherein the synchronizing signal is a synchronizing signal capable of being used to effect sampling of the serial signal for every bit.

5. An image processing apparatus according to claim 3, wherein said serial conversion means includes:
   a) a ROM table to which the R, G and B signals are applied as input addresses, and which outputs the Y, M and C signals;
   b) a shift register for latching an output of said ROM table; and
   c) supply means for supplying a shift clock for sequentially reading the Y, M and C signals from said shift register.

6. A color-image reading apparatus comprising:
   a) reading means for reading an original by performing color separation and outputting a plurality of components of analog image signals of plural colors as a dot sequential signal;
   b) a converter for converting the plurality of components of analog image signals into respective digital image signals, each of the digital image signals representing image information of a respective different one of said plural colors; and
   c) control means for switching a reference voltage for said converter every time there is a change in the color of said plural colors represented by each of the digital image signals being provided to said converter.

7. A color-image reading apparatus according to claim 6, wherein the analog image signals for plural colors are R, G and B signals.

8. A color-image reading apparatus according to claim 6, wherein said control means includes:
   a) generation means for generating a plurality of reference voltages corresponding respectively to the analog image signals for plural colors; and
   b) selection means for selecting one reference voltage from among the plural reference voltages generated by said generation means.

9. A color-image reading apparatus according to claim 6, wherein said reading means is a CCD line sensor.

10. A color handy scanner comprising:
    a) photoelectric conversion means for converting an object color image into color image signals;
    b) serial conversion means for converting the color image signals provided by said photoelectric conversion means into a serial signal;
    c) first outputting means for outputting the serial signal from said serial conversion means;
    d) second outputting means for outputting a synchronizing signal in parallel with the serial signal, said synchronizing signal having a frequency equal to that which a synchronizing signal for monochrome signal would have; and
    e) a case containing said photoelectric conversion means, said serial conversion means, said first outputting means and said second outputting means.

11. A color handy scanner according to claim 10, wherein the color image signals are R, G and B signals.

12. A color handy scanner according to claim 11, wherein said serial conversion means is for converting the R, G and B signals into Y, M and C signals.

13. A color handy scanner according to claim 10, wherein the synchronizing signal is a synchronizing signal capable of being used to effect sampling of the serial signal for every bit.

14. A color handy scanner according to claim 12, wherein said serial conversion means includes:
    a) a ROM table to which the R, G and B signals are applied as input addresses, and which outputs the Y, M and C signals;
    b) a shift register for latching an output of said ROM table; and
    c) supply means for supplying a shift clock for sequentially reading the Y, M and C signals from said shift register.

* * * * *

UNITED STATES PATENT AND TRADEMARK OFFICE
CERTIFICATE OF CORRECTION

PATENT NO. : 5,305,122
DATED : April 19, 1994
INVENTOR(S) : TOSHIO HAYASHI ET AL.          Page 1 of 3

It is certified that error appears in the above-identified patent and that said Letters Patent is hereby corrected as shown below:

On the title page:
AT [57] ABSTRACT

Line 1, "hand-scanning" should read --hand-held--.

SHEET 6 OF 24

FIG. 9, "AV" should read --AU--.

SHEET 7 OF 24

Figure 10:
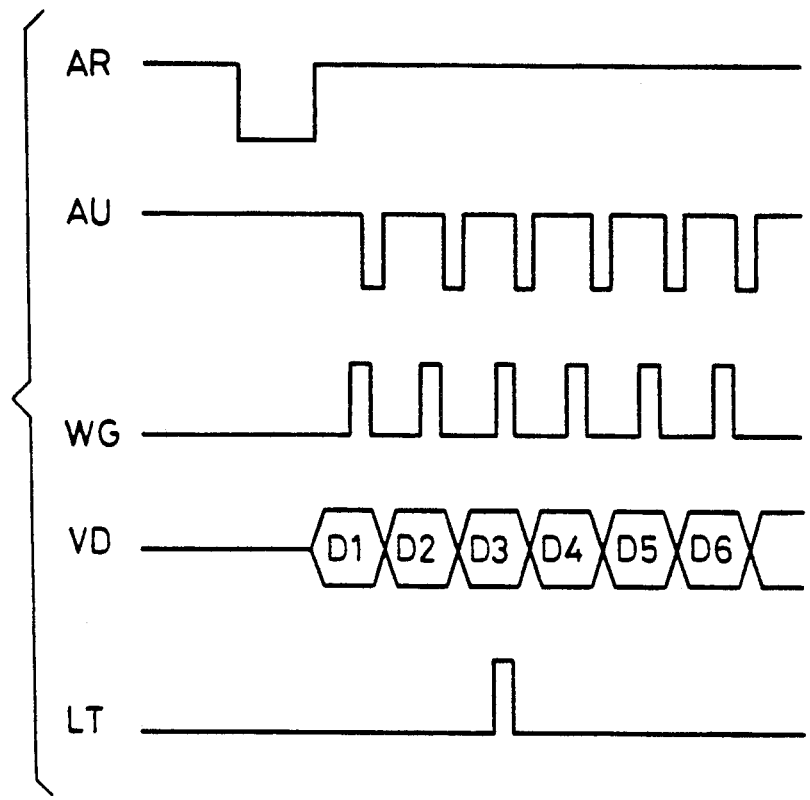
FIGS. 10(a) and 10(b) are diagrams for explaining the operation and the configuration of a dummy-data detection circuit 32, respectively.
Figure 10:
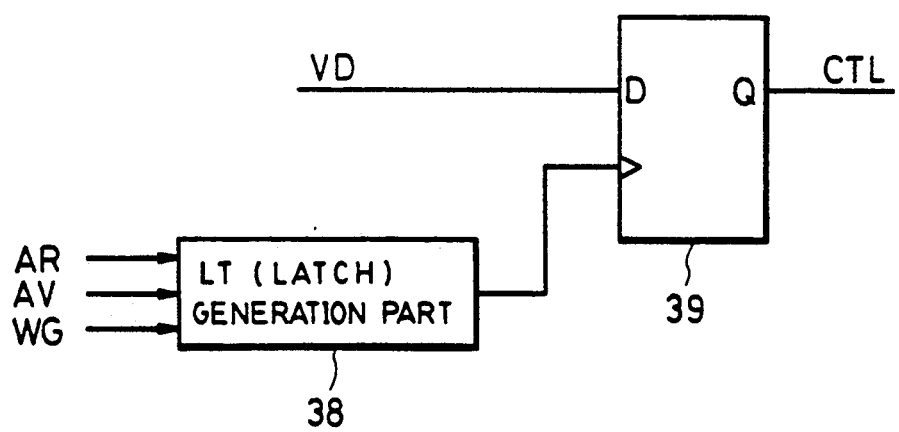

FIG. 10, "AV" should read --AU--.

COLUMN 1

Line 63, "and color displays" should read
　　　　　　--color displays and--.

COLUMN 4

Line 49, "made" should read --make--.

COLUMN 7

Line 8, "4" should read --4-3,--.

UNITED STATES PATENT AND TRADEMARK OFFICE
CERTIFICATE OF CORRECTION

PATENT NO. : 5,305,122
DATED : April 19, 1994
INVENTOR(S) : TOSHIO HAYASHI ET AL.                Page 2 of 3

It is certified that error appears in the above-identified patent and that said Letters Patent is hereby corrected as shown below:

COLUMN 8

Line 7, "WG." should read --WG signals.--.
Line 48, "AV" should read --AU--.

COLUMN 9

Line 8, "If" should read --If as--.
Line 9, "that" should read --to that--.

COLUMN 11

Line 67, "counter," should read --counter 81,--.

COLUMN 14

Line 44, "taken" should read --take--.

COLUMN 15

Line 46, "$(V_T-V_B)/31$" should read --steps of size $(V_T-V_B)/31$--.

COLUMN 16

Line 27, "counter 401," should read --counter 451,--.
Line 34, "B fliers" should read --B filters--.

UNITED STATES PATENT AND TRADEMARK OFFICE
CERTIFICATE OF CORRECTION

PATENT NO. : 5,305,122
DATED : April 19, 1994
INVENTOR(S) : TOSHIO HAYASHI ET AL.

Page 3 of 3

It is certified that error appears in the above-identified patent and that said Letters Patent is hereby corrected as shown below:

COLUMN 17

Line 33, "1," should read --2,--.

COLUMN 18, Lines, 22, 38, 40, 43 and 47,

"handy scanner" should read
--hand-scanner--.

Signed and Sealed this

Twenty-fifth Day of October, 1994

Attest:

BRUCE LEHMAN

Attesting Officer

Commissioner of Patents and Trademarks